US012072646B2

(12) United States Patent
Yoshioka et al.

(10) Patent No.: US 12,072,646 B2
(45) Date of Patent: Aug. 27, 2024

(54) IMAGE FORMING APPARATUS

(71) Applicant: FUJIFILM Business Innovation Corp., Tokyo (JP)

(72) Inventors: Tomoaki Yoshioka, Ebina (JP); Mitsuaki Kuroda, Yokohama (JP); Kazuyoshi Hagiwara, Ebina (JP); Shohei Miyagawa, Yokohama (JP); Kei Tanaka, Ebina (JP); Masaaki Takahashi, Ebina (JP); Yoko Miyamoto, Ebina (JP); Toshiaki Baba, Ebina (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/967,049

(22) Filed: Oct. 17, 2022

(65) Prior Publication Data

US 2023/0038531 A1 Feb. 9, 2023

Related U.S. Application Data

(63) Continuation of application No. 17/340,845, filed on Jun. 7, 2021, now Pat. No. 11,493,863, which is a (Continued)

(30) Foreign Application Priority Data

Feb. 28, 2019 (JP) ................................ 2019-035284

(51) Int. Cl.
*G03G 15/16* (2006.01)
*G03G 15/20* (2006.01)

(52) U.S. Cl.
CPC ......... *G03G 15/1605* (2013.01); *G03G 15/20* (2013.01); *G03G 15/2053* (2013.01)

(58) Field of Classification Search
CPC ............... G03G 15/1605; G03G 15/20; G03G 15/2053
See application file for complete search history.

(56) References Cited

U.S. PATENT DOCUMENTS 3,947,113 A 3/1976 Buchan et al.
5,193,458 A 3/1993 Keller
(Continued)

FOREIGN PATENT DOCUMENTS

CN 101957579 A 1/2011
CN 103293916 A 9/2013
(Continued)

OTHER PUBLICATIONS

Nov. 1, 2022 Office Action issued in Japanese Patent Application No. 2019-035284.
(Continued)

*Primary Examiner* — Victor Verbitsky
(74) *Attorney, Agent, or Firm* — Oliff PLC

(57) ABSTRACT

Provided is an image forming apparatus including: an annular transfer belt having an outer surface on which an image is transferred; a transferring unit including a transfer cylinder having a transfer area that sandwiches a recording medium with the outer surface of the transfer belt to transfer the image from the outer surface of the transfer belt to the recording medium, and a pair of first rotating bodies disposed on both axial end sides of the transfer cylinder; a pair of circulating members each being wound around the first rotating body and being circulated by rotation of the first rotating bodies; and a holding unit attached to the circulating members, the holding unit configured to hold the recording medium, transport the recording medium with circulation of the circulating members, and pass the recording medium through the transfer area.

20 Claims, 20 Drawing Sheets

Related U.S. Application Data continuation of application No. PCT/JP2020/003830, filed on Jan. 31, 2020.

(56) References Cited

U.S. PATENT DOCUMENTS

| | | | |
|---|---|---|---|
| 5,518,231 A | 5/1996 | Reddy | |
| 5,711,625 A | 1/1998 | Takahashi | |
| 6,089,158 A | 7/2000 | Barroso | |
| 2002/0015602 A1 | 2/2002 | Mochimaru et al. | |
| 2005/0111889 A1 | 5/2005 | Cormier et al. | |
| 2006/0042486 A1 | 3/2006 | Forch et al. | |
| 2006/0056886 A1 | 3/2006 | Ohishi et al. | |
| 2010/0189476 A1 * | 7/2010 | Tanaka | G03G 15/657 399/313 |
| 2011/0013952 A1 | 1/2011 | Shimazu | |
| 2013/0223895 A1 | 8/2013 | Ogihara et al. | |
| 2013/0223899 A1 | 8/2013 | Suzuki et al. | |
| 2014/0064803 A1 | 3/2014 | Okabayashi et al. | |
| 2014/0125004 A1 | 5/2014 | Maeyama et al. | |

FOREIGN PATENT DOCUMENTS

| | | |
|---|---|---|
| CN | 103293923 A | 9/2013 |
| CN | 103676570 A | 3/2014 |
| EP | 1642739 B1 | 6/2009 |
| EP | 3926410 A1 | 12/2021 |
| EP | 3929663 A1 | 12/2021 |
| JP | S51-099531 A | 9/1976 |
| JP | S58-005769 A | 1/1983 |
| JP | S58-058574 A | 4/1983 |
| JP | H02-112450 U | 9/1990 |
| JP | H05-127468 A | 5/1993 |
| JP | H09-058035 A | 3/1997 |
| JP | 2952605 B2 | 9/1999 |
| JP | 2002-062744 A | 2/2002 |
| JP | 2006-069209 A | 3/2006 |
| JP | 2006-084677 A | 3/2006 |
| JP | 2006-184403 A | 7/2006 |
| JP | 2009-229726 A | 10/2009 |
| JP | 2010-078863 A | 4/2010 |
| JP | 2011-039148 A | 2/2011 |
| JP | 2012-093513 A | 5/2012 |
| JP | 2012-096863 A | 5/2012 |
| JP | 2014-095747 A | 5/2014 |
| JP | 2014-156056 A | 8/2014 |

OTHER PUBLICATIONS

Mar. 3, 2020 International Search Report issued in International Patent Application No. PCT/JP2020/003830.

Mar. 3, 2020 English Written Opinion issued in International Patent Application No. PCT/JP2020/003830.

Feb. 22, 2023 Office Action issued in Chinese Patent Application No. 202080008573.2.

Nov. 28, 2022 Extended Search Report issued in European Patent Application No. 20763964.2.

May 6, 2024 Office Action issued in European Patent Application No. 20 763 964.2.

* cited by examiner

IMAGE FORMING APPARATUS

CROSS-REFERENCE TO RELATED APPLICATIONS

This application is a continuation of U.S. application Ser. No. 17/340,845, filed on Jun. 7, 2021, which is a continuation of International Application No. PCT/JP2020/003830 filed on Jan. 31, 2020, which claims priority under 35 USC 119 from Japanese Patent Application No. 2019-035284 filed on Feb. 28, 2019, the entire disclosures of each of which are hereby incorporated by reference in their entirety.

BACKGROUND

Technical Field

The present invention relates to an image forming apparatus.

Related Art

Patent Literature 1 discloses a configuration in which a leading portion of paper is gripped by a gripper provided on a circumferential surface of a transport drum to transport the paper.

CITATION LIST

Patent Literature

Patent Literature 1: JP-A-2012-96863

SUMMARY

In a configuration in which a circulating member to which a holding unit holding the recording medium is attached is circulated by rotation of a rotating member to transport a recording medium, and a transfer unit transfers an image to the recording medium, when a rotating body is provided as a member separate from the transfer unit, a large space is required.

Aspect of non-limiting embodiments of the present disclosure relates to save space as compared with a configuration in which a rotating body is provided as a member separate from a transfer unit.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus including: an annular transfer belt having an outer surface on which an image is transferred; a transferring unit including a transfer cylinder having a transfer area that sandwiches a recording medium with the outer surface of the transfer belt to transfer the image from the outer surface of the transfer belt to the recording medium, and a pair of first rotating bodies disposed on both axial end sides of the transfer cylinder; a pair of circulating members each being wound around the first rotating body and being circulated by rotation of the first rotating bodies; and a holding unit attached to the circulating members, the holding unit configured to hold the recording medium, transport the recording medium with circulation of the circulating members, and pass the recording medium through the transfer area.

BRIEF DESCRIPTION OF DRAWINGS

Exemplary embodiment(s) of the present invention will be described in detail based on the following figures, wherein.

DETAILED DESCRIPTION

Hereinafter, an exemplary embodiment according to the present invention is described based on the drawings.

(Image Forming Apparatus 10)

Figure 1:
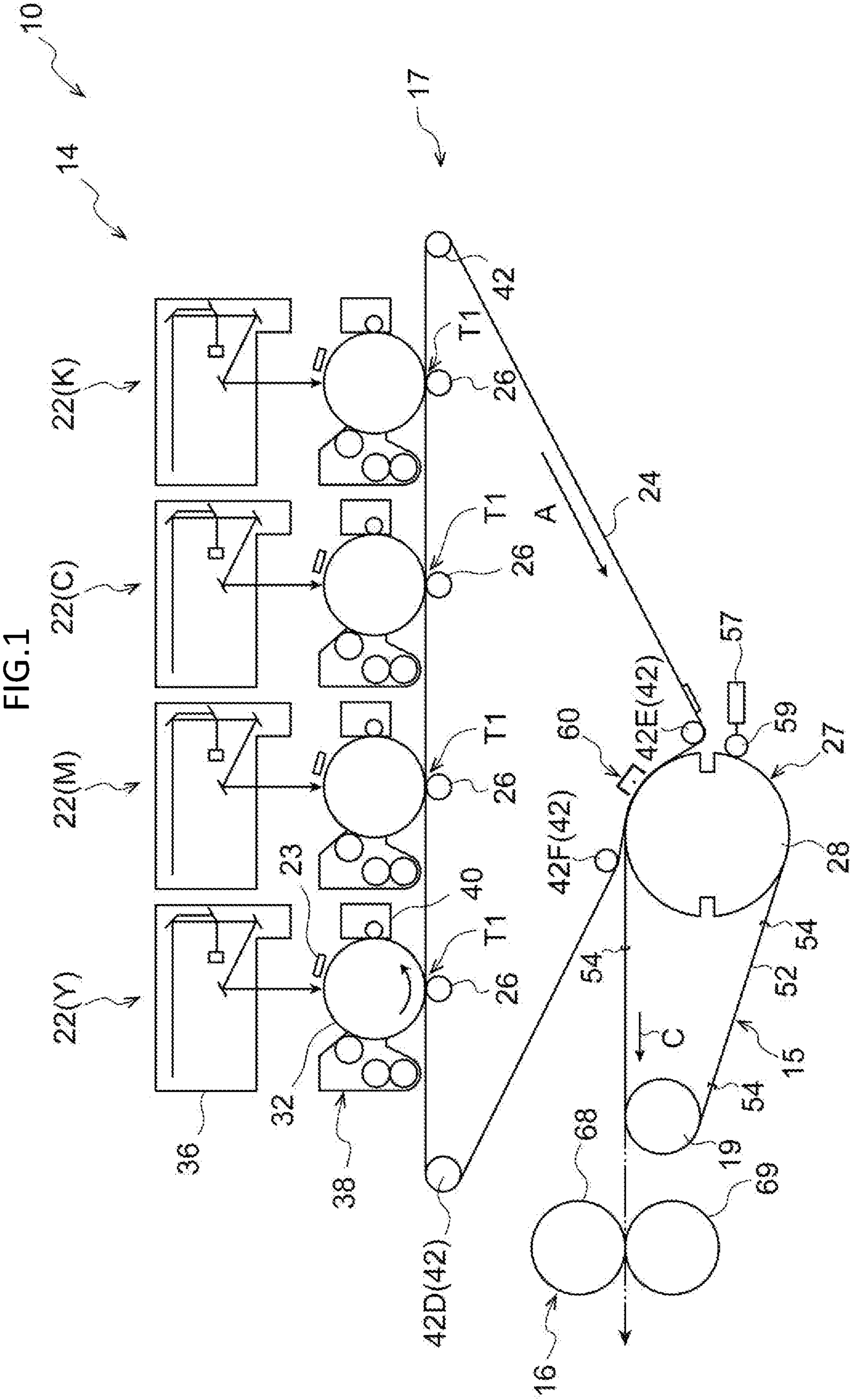
FIG. 1 is a schematic diagram showing an image forming apparatus according to the exemplary embodiment.

The configuration of an image forming apparatus 10 according to the exemplary embodiment is described. FIG. 1 is a schematic diagram showing the configuration of the image forming apparatus 10 according to the exemplary embodiment.

The image forming apparatus 10 shown in FIG. 1 is an example of an image forming apparatus which forms an image on a recording medium. Specifically, the image forming apparatus 10 is an electrophotographic image forming apparatus which forms a toner image (an example of an image) on a recording medium P. More specifically, the image forming apparatus 10 includes an image forming unit 14, a transport unit 15, and a fixing device 16. Hereinafter, each portion (the image forming unit 14, the transport unit 15, and the fixing device 16) of the image forming apparatus 10 is described.

(Image Forming Unit 14)

The image forming unit 14 has a function of forming a toner image (an example of an image) on the recording medium P. Specifically, the image forming unit 14 includes toner image forming units 22 and a transfer device 17.

(Toner Image Forming Unit 22)

A plurality of toner image forming units 22 shown in FIG. 1 are provided to form a toner image for respective color. In the exemplary embodiment, toner image forming units 22 for a total of four colors of yellow (Y), magenta (M), cyan (C) and black (K) are provided. (Y), (M), (C) and (K) shown in FIG. 1 indicate components corresponding to the respective colors.

In the image forming apparatus 10, when it is necessary to distinguish among yellow (Y), magenta (M), cyan (C) and black (K), (Y), (M), (C), and (K) are added after the reference sign of each member; when it is not necessary to distinguish among the above colors, (Y), (M), (C) and (K) may be omitted. Since the toner image forming units 22 of respective colors are configured in the same manner except for the toner to be used, as a representative of the toner image forming units 22 of respective colors, each portions of the toner image forming unit 22(Y) are denoted by reference signs in FIG. 1.

Specifically, the toner image forming unit 22 of each color includes a photoreceptor drum 32 (photoreceptor) which rotates in one direction (for example, a counterclockwise direction in FIG. 1). Further, the toner image forming unit 22 of each color includes a charger 23, an exposurer 36, a developer 38, and a remover 40.

In the toner image forming unit 22 of each color, the charger 23 charges the photoreceptor drum 32. Further, the exposurer 36 exposes the photoreceptor drum 32 charged by the charger 23 to form an electrostatic latent image on the photoreceptor drum 32. In addition, the developer 38 develops the electrostatic latent image formed on the photoreceptor drum 32 by the exposurer 36 to form a toner image. Then, the remover 40 removes the toner remaining on the photoreceptor drum 32 after the transfer of the toner image to a transfer belt 24 to be described later.

(Transfer Device 17)

The transfer device 17 shown in FIG. 1 is a device for transferring the toner image formed by the toner image forming unit 22 to the recording medium P. Specifically, the transfer device 17 superimposes and primarily transfers the toner images of the photoreceptor drums 32 of respective colors on the transfer belt 24 as an intermediate transfer body, and secondarily transfers the superimposed toner image to the recording medium P at a secondary transfer position T2 (a nip area 28A to be described later). More specifically, as shown in FIG. 1, the transfer device 17 includes the transfer belt 24, a primary transfer roller 26, a secondary transfer body 27, and a charger 60.

(Primary Transfer Roller 26)

The primary transfer roller 26 shown in FIG. 1 is a roller for transferring the toner image of the photoreceptor drum 32 of each color to the transfer belt 24 at a primary transfer position T1 between the photoreceptor drum 32 and the primary transfer roller 26. In the exemplary embodiment, the toner image formed on the photoreceptor drum 32 is transferred to the transfer belt 24 at the primary transfer position T1 by applying a primary transfer electric field between the primary transfer roller 26 and the photoreceptor drum 32.

(Transfer Belt 24)

The transfer belt 24 shown in FIG. 1 is an example of an annular transfer belt on which an image is transferred to an outer surface thereof. Specifically, on the transfer belt 24, the toner image is transferred from the photoreceptor drum 32 of each color to an outer circumferential surface (an example of the outer surface) thereof. More specifically, the transfer belt 24 is configured as follows. As shown in FIG. 1, the transfer belt 24 has an annular shape. The transfer belt 24 is wound around a plurality of rollers 42 including a driving roller 42D and winding rollers 42E and 42F to determine the posture thereof. The transfer belt 24 circulates, for example, in a direction of an arrow A (hereinafter, referred to as belt circulating direction A), which is predetermined, by the driving roller 42D of the plurality of rolls 42 being rotationally driven by a drive unit (not shown). The specific configuration of the winding rollers 42E and 42F is to be described later.

(Secondary Transfer Body 27)

Figure 2:
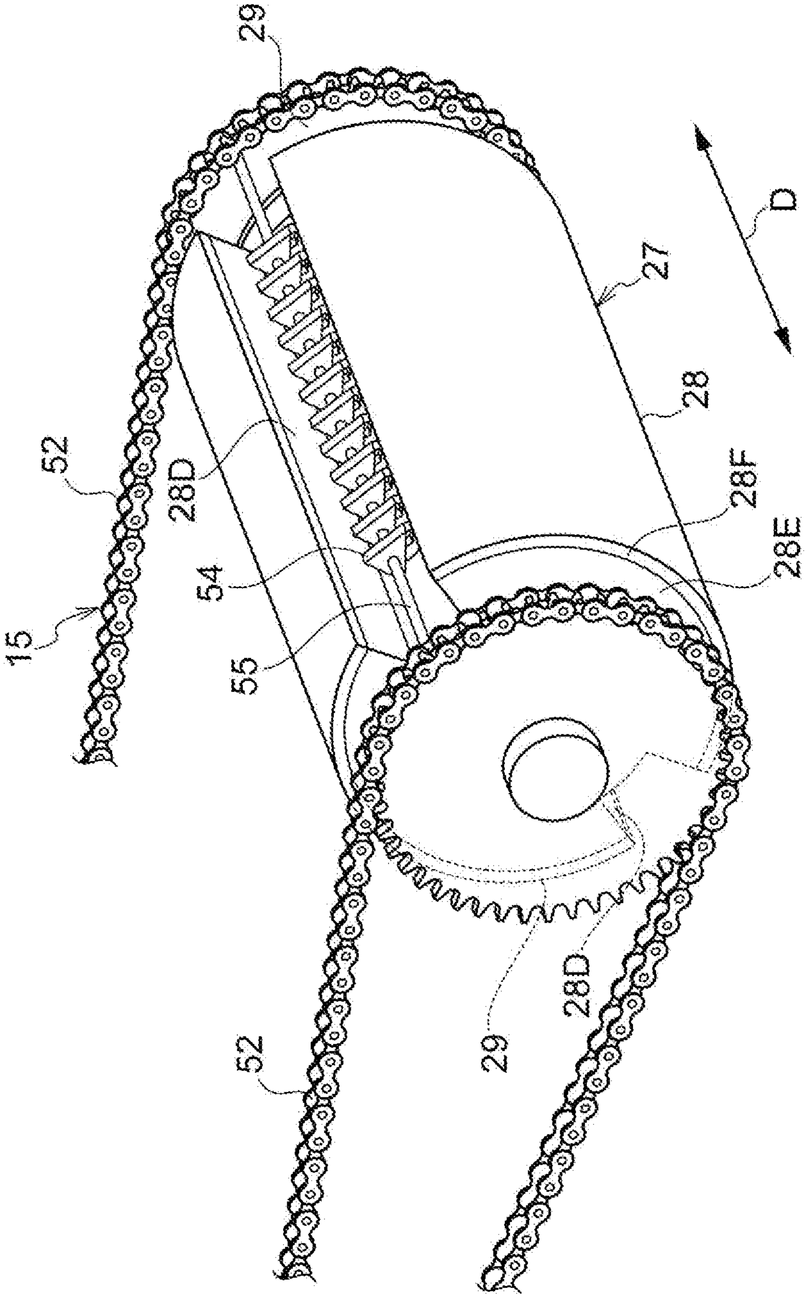
FIG. 2 is an enlarged perspective view showing a secondary transfer portion of the image forming apparatus according to the exemplary embodiment.
Figure 3:
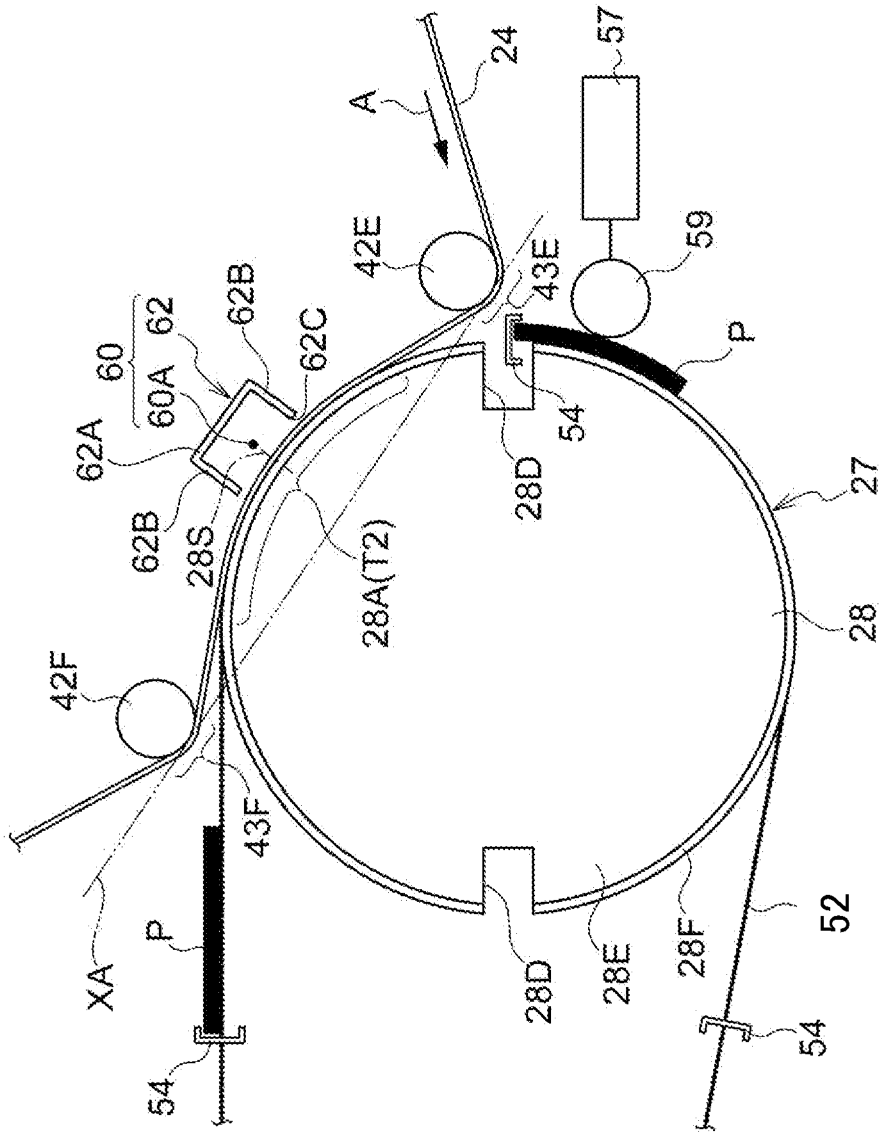
FIG. 3 is an enlarged side view showing the secondary transfer portion of the image forming apparatus according to the exemplary embodiment.

The secondary transfer body 27 is an example of a transfer unit. Specifically, as shown in FIG. 2, the secondary transfer body 27 includes a transfer cylinder 28 and a pair of sprockets 29. The transfer cylinder 28 is an example of a transfer cylinder having a transfer area which sandwiches the recording medium with the outer surface of the transfer belt to transfer an image from the transfer belt to the recording medium. Specifically, as shown in FIG. 3, the transfer cylinder 28 has the nip area 28A (an example of the transfer area) which sandwiches the recording medium P with the outer circumferential surface of the transfer belt 24. The nip area 28A can be said to be a sandwiching area since it is an area sandwiching the recording medium P. The transfer cylinder 28 can be said to be a sandwiching portion since it sandwiches the recording medium P with the transfer belt 24. In FIG. 3, the recording medium P is simplified and a part thereof is shown.

The nip area 28A is formed by winding the transfer belt 24 around the transfer cylinder 28. In other words, the nip area 28A can be said to be a contact area where the transfer belt 24 and the transfer cylinder 28 come into contact with each other. The nip area 28A is the secondary transfer position T2 where the toner image is transferred from the transfer belt 24 to the recording medium P. In addition, the transfer cylinder 28 sandwiches the recording medium P with the transfer belt 24 in the nip area 28A to transport the recording medium P.

The pair of sprockets 29 is an example of a rotating body, and is an example of a first rotating body. As shown in FIG. 2, the pair of sprockets 29 is disposed on both axial end sides of the transfer cylinder 28. In other words, the transfer cylinder 28 is provided between the pair of sprockets 29. Further, the pair of sprockets 29 is disposed coaxially with the transfer cylinder 28 and configured to rotate integrally with the transfer cylinder 28. The secondary transfer body 27 is rotationally driven by a drive unit (not shown).

Figure 4:
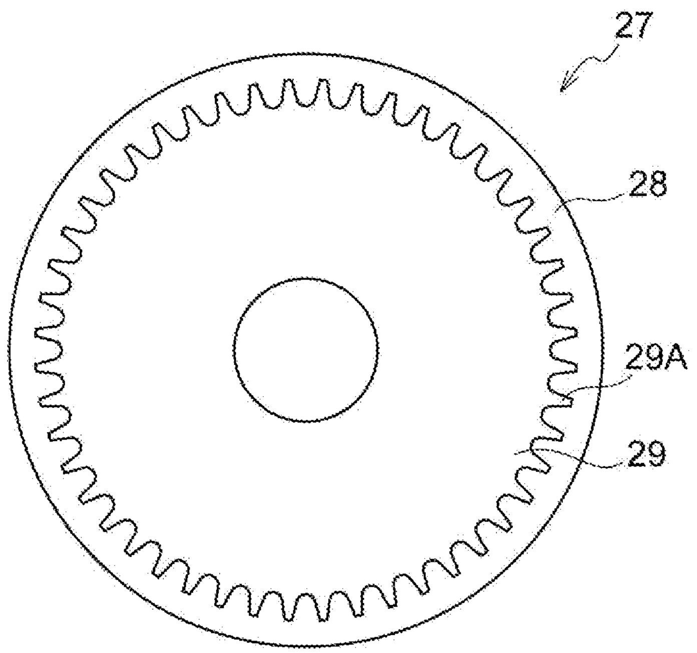
FIG. 4 is a side view showing a secondary transfer body according to the exemplary embodiment.

As shown in FIG. 4, an outer diameter of each of the pair of sprockets 29 is smaller than an outer diameter of the transfer cylinder 28. The outer diameter of the sprocket 29 is an outer diameter including a teeth 29A (i.e., including the diameter of the tooth tip).

The transfer cylinder 28 includes a base member 28E and a surface layer 28F which is wound around an outer circumference of the base member 28E and exchangeable with respect to the base member 28E. As the base member 28E, a metal material such as stainless steel is used. As the surface layer 28F, a resin material such as urethane rubber, ethylene-propylene rubber (EPM), silicone rubber, fluororubber (FKM), and epichlorohydrin-butadiene rubber is used. The surface layer 28F is detachably fixed to the base member 28E. Therefore, the surface layer 28F can be detached from the base member 28E, and an unused surface layer 28F can be attached thereto.

Further, on the outer circumference of the transfer cylinder 28, two recessed portions 28D are formed, in which a gripper 54 and an attaching member 55 of the transport unit 15, which are to be described later, are accommodated. The number of the recessed portions 28D may be one, or three or more.

(Charger 60)

The charger 60 is an example of a facing portion which faces the sandwiching portion and is on the inner side of the transfer belt. As shown in FIG. 3, the charger 60 is disposed on the inner side of the transfer belt 24 so as to face the transfer cylinder 28. Specifically, the charger 60 faces the transfer cylinder 28 in an area including a center 28S in the transport direction of the transport unit 15 in the nip area 28A.

The charger 60 is a charger (so-called corotron charger) for transferring the toner image of the transfer belt 24 by corona discharge. Specifically, the charger 60 includes a discharge wire 60A and a case 62 (housing). The discharge wire 60A is linear having a length along the axial direction of the transfer cylinder 28. The discharge wire 60A is not in contact with the inner surface of the transfer belt 24. That is, the discharge wire 60A has a gap with the inner surface of the transfer belt 24.

The case 62 is an example of a surrounding portion surrounding the discharge wire. The case 62 is formed in a box shape, and has an opening portion 62C on the transfer cylinder 28 side (i.e., the lower side).

Specifically, the case 62 has a first wall 62A disposed on a side opposite to the transfer cylinder 28 with respect to the discharge wire 60A, and a pair of second walls 62B respectively disposed on an upstream side and a downstream side of the belt circulating direction A with respect to the discharge wire 60A. Furthermore, the case 62 has third walls (not shown) disposed on both ends in a length direction of the discharge wire 60A.

The case 62 is not in contact with the inner surface of the transfer belt 24. That is, the case 62 has a gap with the inner surface of the transfer belt 24.

The case 62 may have a configuration which may have an opening portion in the third walls (not shown) disposed on both ends in the length direction of the discharge wire 60A, and may have an opening portion 62C at least on the transfer cylinder 28 side (i.e., the lower side).

The recording medium P is electrostatically attracted to the transfer belt 24 and the transfer cylinder 28 by applying a voltage to the discharge wire 60A and discharging the voltage in the charger 60. In addition, the transfer belt 24 is charged by the discharge of the discharge wire 60A in the charger 60, and the toner image superimposed on the transfer belt 24 is transferred from the transfer belt 24 to the recording medium P at the nip area 28A (secondary transfer position T2).

(Winding Rollers 42E and 42F)

The winding rollers 42E and 42F shown in FIGS. 1 and 3 are examples of a pair of winding rollers around which the transfer belt is wound on the inner side of the transfer belt. The winding rollers 42E and 42F are respectively disposed on the upstream side and the downstream side of the belt circulating direction A with respect to the charger 60.

As shown in FIG. 3, the winding rollers 42E and 42F are disposed such that a common circumscribed line XA of the winding rollers 42E and 42F passes above the transfer cylinder 28 when viewed in the axial direction of the winding rollers 42E and 42F.

Here, the common circumscribed line XA is a circumscribed line on which the winding rollers 42E and 42F are disposed on the same side of the circumscribed line (i.e., common circumscribed line) in contact with both the winding rollers 42E and 42F. More specifically, the common circumscribed line XA according to the exemplary embodiment is a circumscribed line in contact with a portion of the winding rollers 42E and 42F around which the transfer belt 24 is wound. In other words, the common circumscribed line XA according to the exemplary embodiment is a circumscribed line in contact with the winding rollers 42E and 42F on the transfer cylinder 28 side with respect to the charger 60.

Further, both winding portions 43E and 43F wound around the winding rollers 42E and 42F on the transfer belt 24 are separated from the transfer cylinder 28. The winding portion 43E is a winding portion on the upstream side in the transport direction of the recording medium P with respect to the winding portion 43F.

(Transport Unit 15)

The transport unit 15 shown in FIG. 1 to FIG. 3 has a function of transporting the recording medium P. Specifically, the transport unit 15 has a function of transporting the recording medium P to pass through the nip area 28A (see FIG. 3). More specifically, as shown in FIGS. 1 and 2, the transport unit 15 includes a pair of sprockets 19, a pair of chains 52, the gripper 54, and an attracting roller 59. The pair of chains 52 is an example of a circulating member. The gripper 54 is an example of a holding unit which holds a recording medium. In FIG. 1, the sprockets 19, the chains 52 and the gripper 54 are shown in a simplified manner. In FIG. 3, the chains 52 and the gripper 54 are shown in a simplified manner.

As shown in FIG. 1, the pair of sprockets 19 is disposed at an interval in a front-rear direction of the apparatus on the fixing device 16 side (left side in FIG. 1) with respect to the pair of sprockets 29 included in the secondary transfer body 27. The pair of sprockets 19 is coaxially supported on a main body (not shown) of the image forming apparatus 10 so as to be integrally rotatable.

As shown in FIG. 1, the pair of chains 52 is annularly formed. As shown in FIG. 2, the pair of chains 52 is disposed at an interval in the front-rear direction (direction D in FIG. 2) of the apparatus. The pair of chains 52 is respectively wound around the pair of sprockets 29 of the secondary transfer body 27 and the pair of sprockets 19 (see FIG. 1).

Then, when the transfer cylinder 28 including the pair of sprockets 29 rotates, the chains 52 circulate in a circulating direction C (a direction of an arrow C in FIG. 1). Here, in the circulating direction C, the chains 52 are wound to straddle at least an area facing the charger 60 in the nip area 28A. Accordingly, since the recording medium P is transported by the chains 52 during the secondary transfer, the speed fluctuation of the recording medium P is prevented at the secondary transfer position T2. Further, the chains 52 are wound to straddle the entire nip area 28A. Accordingly, the speed fluctuation of the recording medium P is prevented more reliably at the secondary transfer position T2. In the exemplary embodiment, a winding angle at which the chains 52 are wound around the sprockets 29 is 180 degrees or more. Thus, the recording medium P can be easily transported along a surface of the transfer cylinder 28. In order to facilitate transport of the recording medium P along the surface of the transfer cylinder 28, it is desirable to set the winding angle to 90 degrees or more. In addition, in the exemplary embodiment, in the circulating direction C, the winding angle between the start of winding of the chains 52 and the arrival at the secondary transfer position T2 is 90 degrees or more. Thus, the recording medium P is likely to be transported along the surface of the transfer cylinder 28 before arriving at the secondary transfer position T2.

In the exemplary embodiment, the chains 52 travel between the transfer belt 24 and the transfer cylinder 28 on the downstream side in the transport direction with respect to the nip area 28A in a side view. In other words, the chain 52 has a gap with respect to the winding portion 43F in the side view, and has a gap with respect to the transfer cylinder 28 on the side opposite to the winding portion 43F with respect to the chain 52.

As shown in FIG. 2, the attaching member 55 to which the gripper 54 is attached is across the pair of chains 52 along the front-rear direction of the apparatus. A plurality of attaching members 55 are fixed to the pair of chains 52 at predetermined intervals along the circumferential direction (the circulating direction C) of the chain 52.

Figure 5:
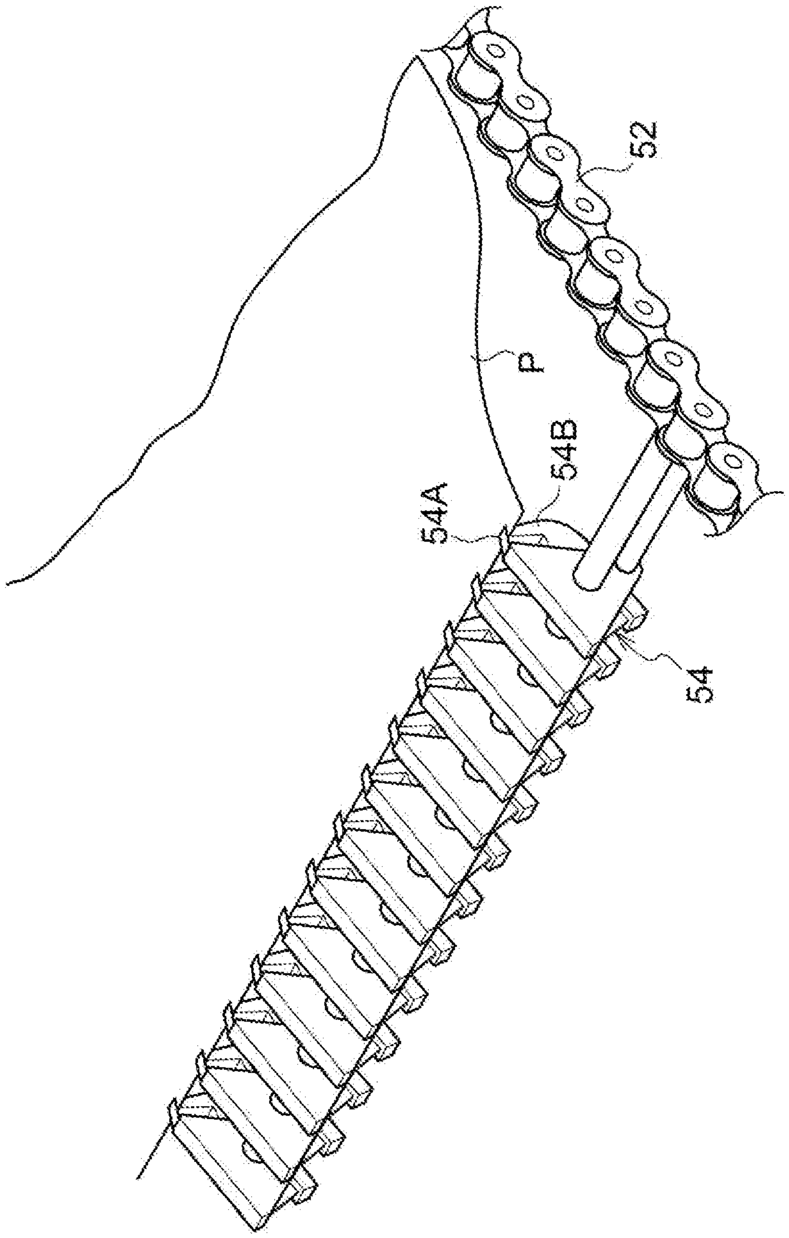
FIG. 5 is a perspective view showing a gripper according to the exemplary embodiment.

As shown in FIG. 2, a plurality of grippers 54 are attached to the attaching member 55 at predetermined intervals along the front-rear direction of the apparatus. In other words, the gripper 54 is attached to the chain 52 via the attaching member 55. The gripper 54 has a function of holding a leading end portion of the recording medium P. Specifically, the gripper 54 includes a claw 54A and a claw base 54B as shown in FIG. 5. The gripper 54 holds the recording medium P by sandwiching the leading end portion of the recording medium P between the claw 54A and the claw base 54B. In other words, the gripper 54 can be said to be an example of a holding unit which holds the recording medium P in a thickness direction.

More specifically, the gripper 54 holds the leading end portion of the recording medium P outside an image area of the recording medium P. The image area of the recording medium P is an area on the recording medium P to which the toner image is transferred. In the gripper 54, for example, the claw 54A is pressed against the claw base 54B by a spring or the like, and the claw 54A is opened and closed relative to the claw base 54B by the action of a cam or the like.

In the transport unit 15, as shown in FIG. 5, the gripper 54 holds the leading end portion of the recording medium P sent from an accommodating portion (not shown) in which the recording medium P is accommodated. Further, when the chain 52 circulates in the circulating direction C in a state where the gripper 54 holds the front end of the recording medium P, the transport unit 15 transports the recording medium P by moving the gripper 54, and the recording medium P passes through the nip area 28A together with the gripper 54 while being held by the gripper 54. Furthermore, the transport unit 15 transports the recording medium P to the fixing device 16 after passing through the nip area 28A.

The attracting roller 59 is in contact with the transfer cylinder 28 on the upstream side in the transport direction with respect to the nip area 28A. The attracting roller 59 presses the recording medium P against the transfer cylinder 28 and charges the recording medium P by supplying power from a power source 57. Accordingly, the recording medium P is electrostatically attracted to the outer circumferential surface of the transfer cylinder 28.

(Fixing Device 16)

The fixing device 16 shown in FIG. 1 is a device for fixing the toner image transferred to the recording medium P by the transfer cylinder 28 to the recording medium P. More specifically, as shown in FIG. 1, the fixing device 16 includes a heating roller 68 as a heating member and a pressure roller 69 as a pressure member. The fixing device 16 fixes the toner image formed on the recording medium P to the recording medium P by heating and pressing the recording medium P with the heating roller 68 and the pressure roller 69.

Effects According to Exemplary Embodiment

Next, effects according to the exemplary embodiment are described.

According to the image forming apparatus of the exemplary embodiment, as shown in FIG. 5, the gripper 54 holds the leading end portion of the recording medium P sent from the accommodating portion (not shown) in which the recording medium P is accommodated. Further, when the chain 52 circulates in the circulating direction C in a state where the gripper 54 holds the front end of the recording medium P, the recording medium P is transported by moving the gripper 54, and passes through the nip area 28A together with the gripper 54 while the recording medium P is held by the gripper 54 (see FIG. 3). The recording medium P is electrostatically attracted to the transfer cylinder 28 by the attracting roller 59 on the upstream side in the transport direction with respect to the nip area 28A.

When the recording medium P passes through the nip area 28A, the recording medium P is electrostatically attracted to the transfer belt 24 and the transfer cylinder 28 by the discharge of the discharge wire 60A in the charger 60. In addition, due to the discharge of the discharge wire 60A in the charger 60, the toner image superimposed on the transfer belt 24 is transferred from the transfer belt 24 to the recording medium P at the nip area 28A (secondary transfer position T2).

In the exemplary embodiment, accordingly, the recording medium P is transported by circulating the chains 52 to which the gripper 54 is attached. Here, even when the sprockets 29 rotate at a constant speed, as the sprockets 29 and the sprockets 19 rotate, meshing positions of the teeth of the sprockets 29 and the teeth of the sprockets 19 with the chains 52 may change, causing the speed fluctuation of the chains 52 to occur.

Figure 6:
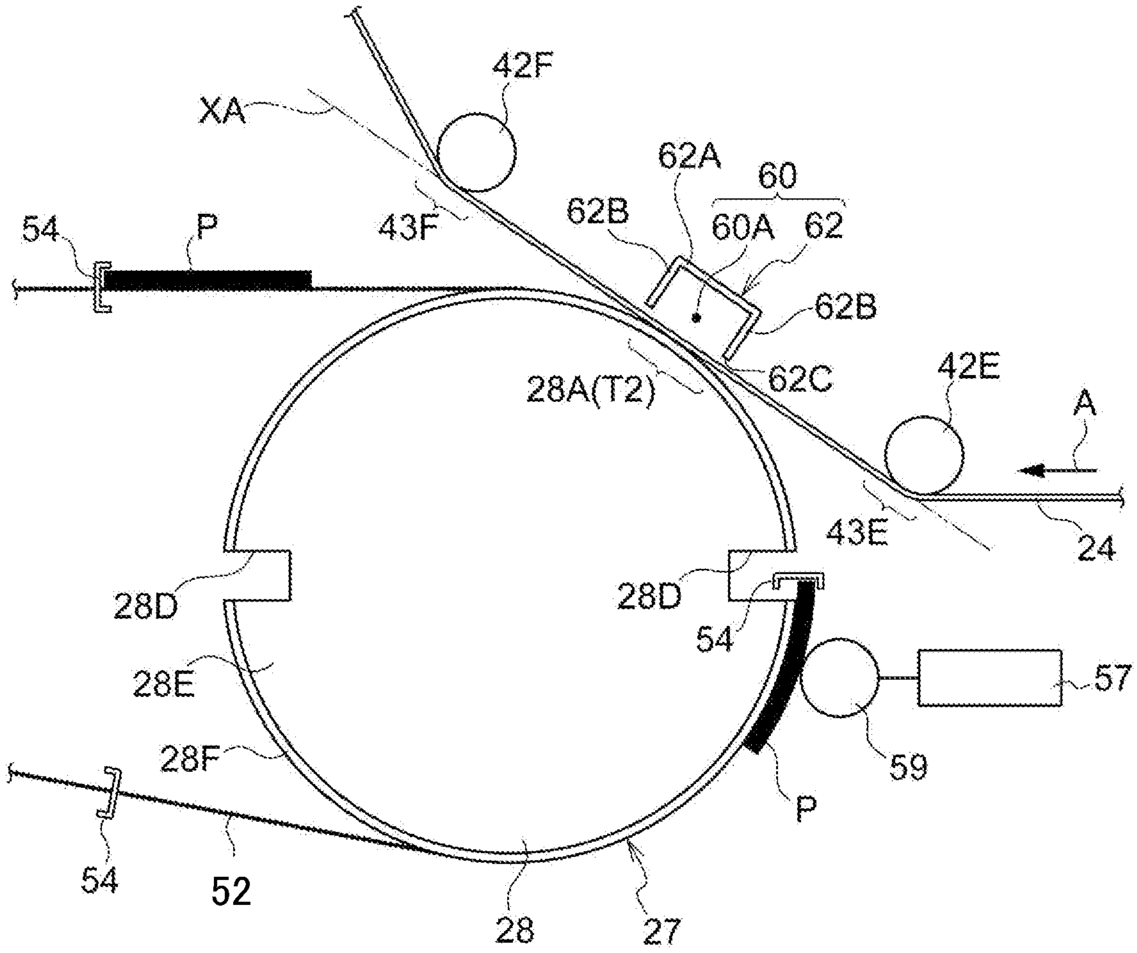
FIG. 6 is an enlarged view showing a secondary transfer portion of an image forming apparatus according to an example in which an outer surface of a transfer belt is in point contact with a transfer cylinder.

Here, when viewed in a width direction of the transfer belt 24 (in a depth direction of the sheet of FIG. 6), in the configuration in which the outer surface of the transfer belt 24 is in point contact with the transfer cylinder 28 as shown in FIG. 6, the speed fluctuation of the chain 52 may cause the speed fluctuation of the recording medium P in speed in the nip area 28A. When the speed fluctuation of the recording medium P occurs in the nip area 28A, a transfer failure of the toner image may occur.

In contrast, in the exemplary embodiment, as shown in FIG. 3, the nip area 28A is formed by winding the transfer belt 24 around the transfer cylinder 28. Thus, as compared with the configuration in which the outer surface of the transfer belt 24 is in point contact with the transfer cylinder 28 as shown in FIG. 6, the nip area 28A sandwiching the recording medium P between the transfer belt 24 and the transfer cylinder 28 is wider in the belt circulating direction A. Therefore, as compared with the configuration in which the outer surface of the transfer belt 24 is in point contact with the transfer cylinder 28 as shown in FIG. 6, the speed fluctuation of the recording medium P in the nip area 28A is prevented, and the transfer failure of the toner image is prevented. The configuration in which the outer surface of the transfer belt 24 is in point contact with the transfer cylinder 28 as shown in FIG. 6 can also be said to have a configuration in which the common circumscribed line XA displaces from the transfer cylinder 28.

In the exemplary embodiment, as shown in FIG. 3, the winding rollers 42E and 42F are disposed such that a common circumscribed line XA of the winding rollers 42E and 42F passes above the transfer cylinder 28 when viewed in the axial direction of the winding rollers 42E and 42F. Thus, as compared with the configuration in which the common circumscribed line XA displaces from the transfer cylinder 28 (see FIG. 6), the nip area 28A is wider in the belt circulating direction A. Therefore, as compared with the configuration in which the outer surface of the transfer belt 24 is in point contact with the transfer cylinder 28 as shown in FIG. 6, the speed fluctuation of the recording medium P in the nip area 28A is prevented, and the transfer failure of the toner image is prevented.

The recording medium P is attached to the transfer cylinder 28 and the transfer belt 24 by being sandwiched between the transfer belt 24 and the transfer cylinder 28 in the nip area 28A. For example, when the transfer belt 24 is separated from the recording medium P, the recording medium P is peeled off from the transfer belt 24.

Here, in the configuration in which the recording medium P is transported by only a pair of transport rollers and passed through the nip area 28A (hereinafter, this configuration is referred to as a comparative example), the recording medium P attached to the transfer cylinder 28 is less likely to be pulled in a direction away from the transfer cylinder 28 and is less likely to be peeled off from the transfer cylinder 28. The comparative example in which the recording medium P is transported by only the pair of transport rollers can be said to be a configuration in which the recording medium P is transported without being held.

In contrast, in the exemplary embodiment, as described above, the gripper 54 is moved to transport the recording medium P, and the recording medium P passes through the nip area 28A together with the gripper 54 while being held by the gripper 54.

Thus, as compared with the comparative example, the recording medium P attached to the transfer cylinder 28 is likely to be pulled in the direction away from the transfer cylinder 28 and is likely to be peeled off from the transfer cylinder 28. Therefore, the peeling defect in peeling the recording medium P on which the toner image is transferred from the transfer cylinder 28 is prevented.

In addition, in the exemplary embodiment, as shown in FIG. 3, the winding portion 43E of the transfer belt 24 is separated from the transfer cylinder 28. Thus, as compared with a configuration in which the winding portion 43E of the transfer belt 24 is in contact with the transfer cylinder 28, the recording medium P can be easily introduced into the nip area 28A.

Further, in the exemplary embodiment, both the winding portion 43E and the winding portion 43F of the transfer belt 24 are separated from the transfer cylinder 28. Thus, as compared to a configuration in which either the winding portion 43E or the winding portion 43F is in contact with the transfer cylinder 28, the load (nip load) sandwiching the recording medium P between the transfer belt 24 and the transfer cylinder 28 is reduced.

Furthermore, in the exemplary embodiment, the pair of sprockets 29 is provided on the secondary transfer body 27. Thus, space is saved as compared with a configuration in which the pair of sprockets 29 is provided as a member separate from the secondary transfer body 27. Examples of the configuration in which the pair of sprockets 29 is provided as a separate member include a configuration in which the sprockets 29 are disposed at positions displacing from the axis of the transfer cylinder 28. Other examples of the configuration in which the pair of sprockets 29 is provided as a separate member include a configuration in which the sprockets 29 rotate by a drive different from the transfer cylinder 28

In addition, in the exemplary embodiment, as shown in FIG. 4, the outer diameter of each of the pair of sprockets 29 is smaller than the outer diameter of the transfer cylinder 28. Here, in a configuration in which the outer diameter of each of the pair of sprockets 29 is equal to or larger than the outer diameter of the transfer cylinder 28, the circumferential speed of the sprockets 29 is larger than the circumferential speed of the transfer cylinder 28. Accordingly, the transport speed of the recording medium P held by the gripper 54 attached to the chain 52 wound around the sprocket 29 may be larger than the circumferential speed of the transfer cylinder 28. Accordingly, in the nip area 28A, the recording medium P may be pulled and displaced to the downstream side in the transport direction with respect to the transfer cylinder 28 and the transfer belt 24.

In contrast, in the exemplary embodiment, as described above, since the outer diameter of each of the pair of sprockets 29 is smaller than the outer diameter of the transfer cylinder 28, the recording medium P is prevented from being displaced to the downstream side in the transport direction with respect to the transfer cylinder 28 and the transfer belt 24, as compared with the configuration in which the outer diameter of each of the pair of sprockets 29 is equal to or larger than the outer diameter of the transfer cylinder 28.

Further, in the exemplary embodiment, the transfer cylinder 28 includes the base member 28E and the surface layer 28F which is wound around the outer circumference of the base member 28E and exchangeable with respect to the base member 28E.

Thus, when the surface layer 28F is deteriorated, it is sufficient to replace only the surface layer 28F, and it is not necessary to replace the secondary transfer body 27 including the pair of sprockets 29.

(Modification Relating to Winding Portion 43E and Winding Portion 43F of Transfer Belt 24)

Figure 7:
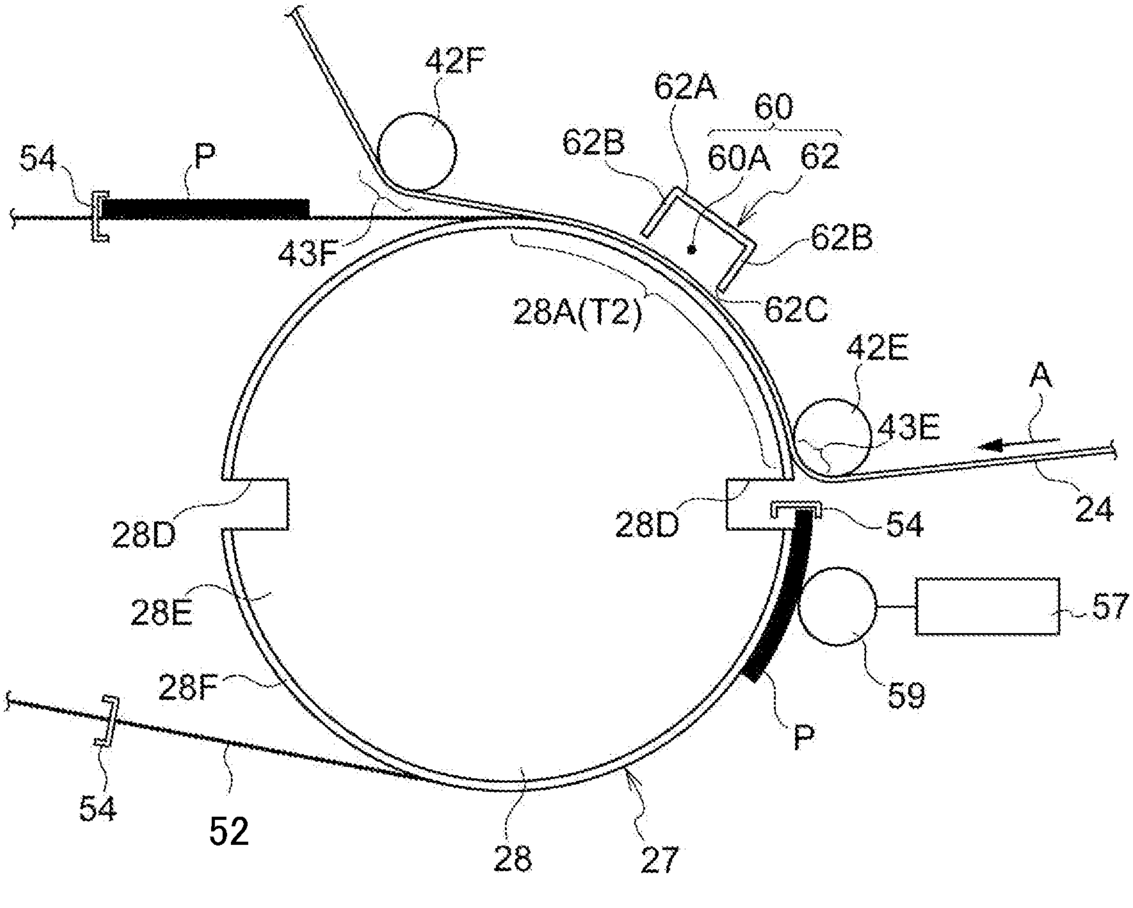
FIG. 7 is an enlarged view showing a secondary transfer portion of an image forming apparatus according to a modification.

In the exemplary embodiment, both the winding portion 43E and the winding portion 43F of the transfer belt 24 are separated from the transfer cylinder 28, but the present invention is not limited thereto. For example, as shown in FIG. 7, the winding portion 43E may be in contact with the transfer cylinder 28, and the winding portion 43F may be separated from the transfer cylinder 28.

According to this configuration, the nip area 28A is wider in the belt circulating direction A as compared with the configuration in which both the winding portions 43E and 43F are separated from the transfer cylinder 28.

Figure 8:
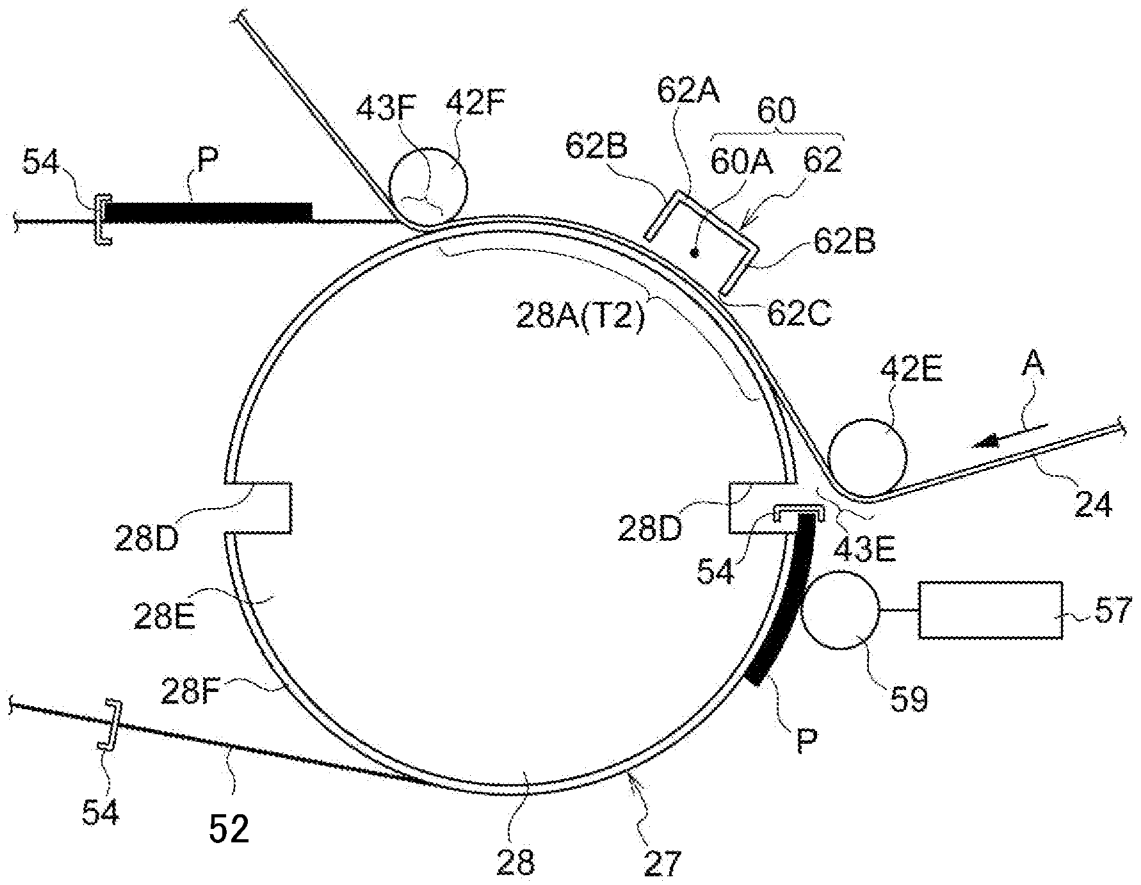
FIG. 8 is an enlarged view showing a secondary transfer portion of an image forming apparatus according to a modification.

In addition, as shown in FIG. 8, the winding portion 43E may be separated from the transfer cylinder 28, and the winding portion 43F may be in contact with the transfer cylinder 28.

According to this configuration, the nip area 28A is wider in the belt circulating direction A as compared with the configuration in which both the winding portions 43E and 43F are separated from the transfer cylinder 28. In addition, as compared with a configuration in which the winding portion 43E of the winding roller 42E is in contact with the transfer cylinder 28, the recording medium P can be easily introduced into the nip area 28A.

Figure 9:
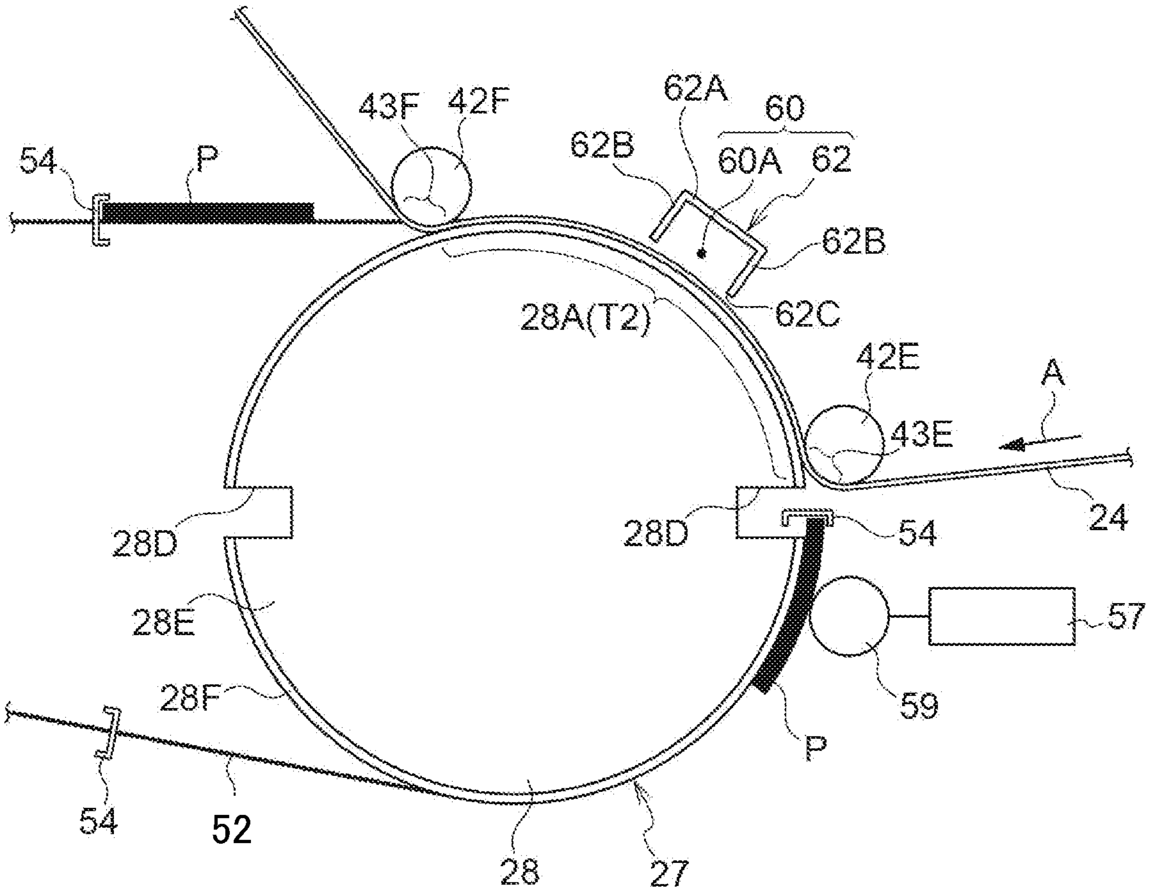
FIG. 9 is an enlarged view showing a secondary transfer portion of an image forming apparatus according to a modification.

Further, as shown in FIG. 9, both the winding portion 43E and the winding portion 43F may be in contact with the transfer cylinder 28.

According to this configuration, the nip area 28A is wider in the belt circulating direction A as compared with the configuration in which either one the winding portions 43E and 43F is separated from the transfer cylinder 28.

(Modification Relating to Charger 60)

In the exemplary embodiment, as shown in FIG. 3, the charger 60 faces the transfer cylinder 28 in an area including the center 28S in the transport direction of the transport unit 15 in the nip area 28A, but the present invention is not limited thereto.

Figure 10:
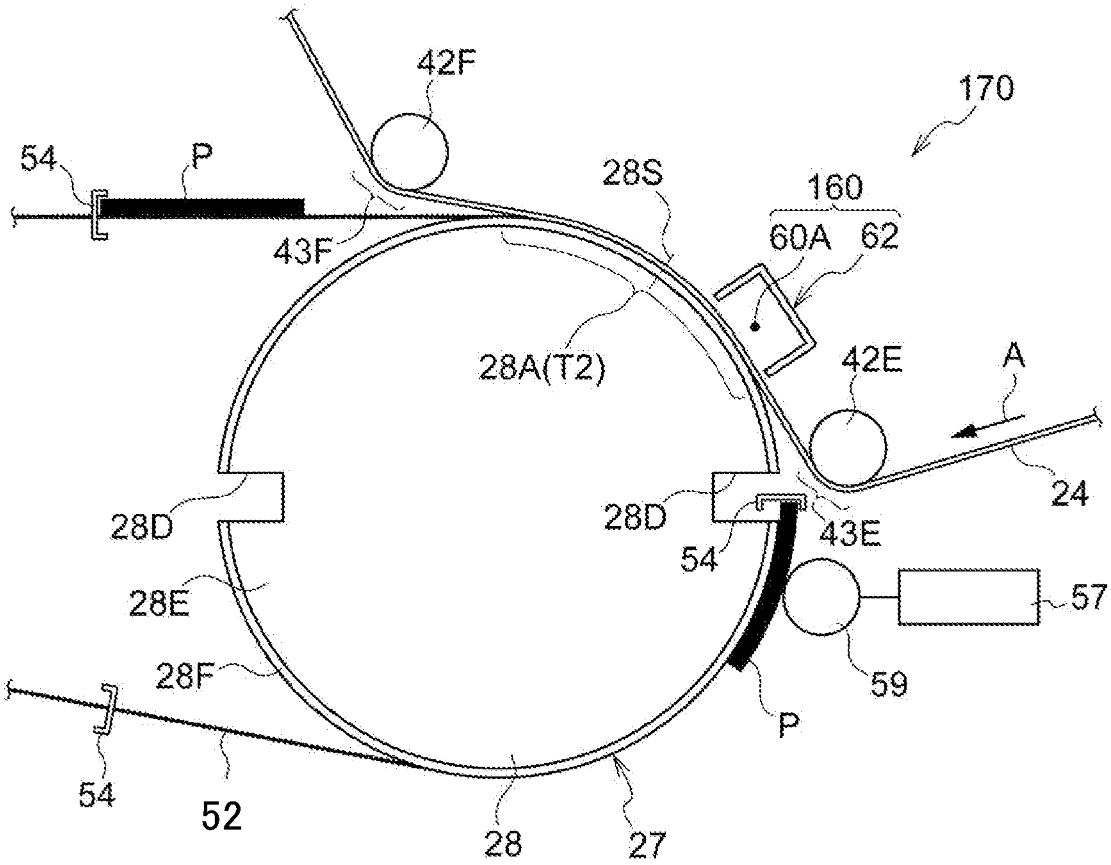
FIG. 10 is an enlarged view showing a secondary transfer portion of an image forming apparatus according to a modification.

Examples of the facing portion include, as shown in FIG. 10, a facing portion 170 including a charger 160 disposed on the upstream side of the center 28S in the nip area 28A. The charger 160 is configured in the same manner as the charger 60 described above. The charger 160 is an example of the facing portion on the upstream side.

According to this configuration, a range in which the recording medium P is electrostatically attracted to the transfer belt 24 and the transfer cylinder 28 is wider, as compared with a configuration including only a charger disposed in a range from the center 28S of the nip area 28A to the downstream side.

Figure 11:
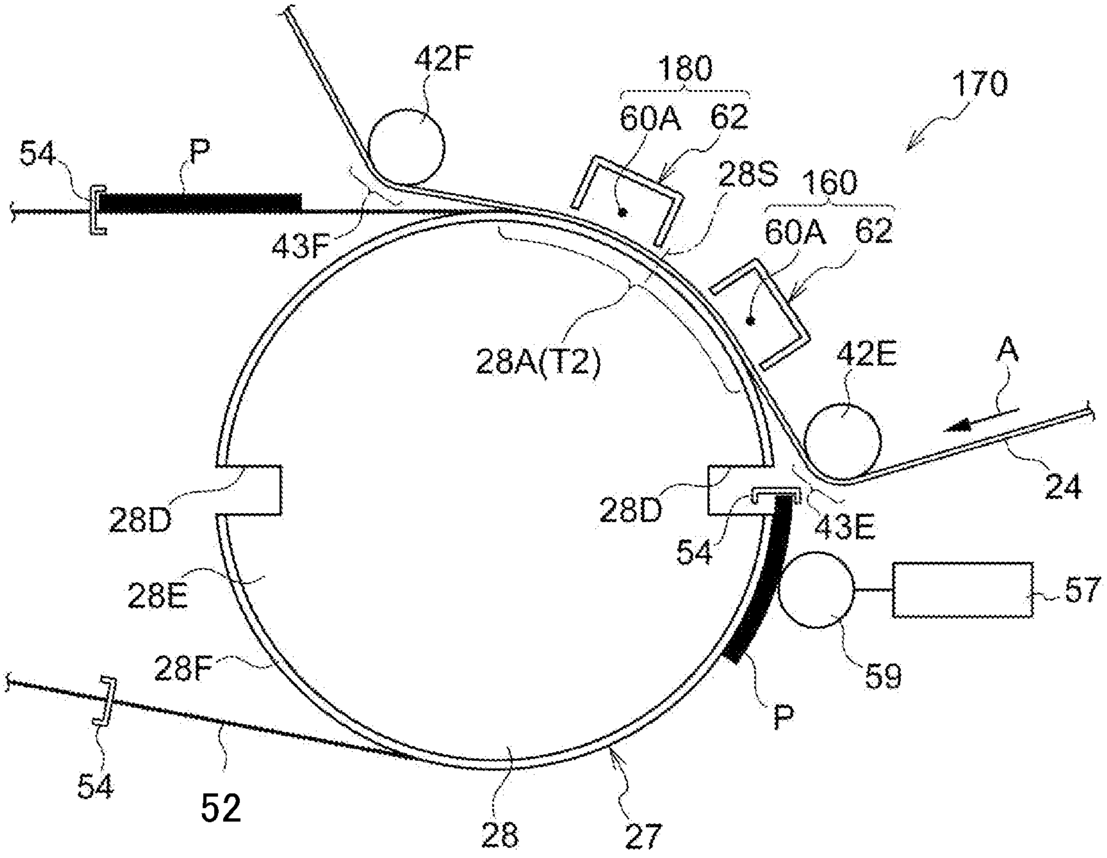
FIG. 11 is an enlarged view showing a secondary transfer portion of an image forming apparatus according to a modification.

Further, as shown in FIG. 11, the facing portion 170 may include a charger 180 which is disposed on the downstream side of the charger 160 in the transport direction and to which a voltage larger than that of the charger 160 is applied. Here, a transfer voltage value optimal for transferring the toner image to the recording medium P is larger than an electrostatic attraction voltage value optimum for electrostatically attracting the recording medium P to the transfer belt 24 and the transfer cylinder 28. Then, for example, the electrostatic attraction voltage value is applied to the charger 160, and the transfer voltage value is applied to the charger 180. The charger 180 is an example of the facing portion on the downstream side.

In the configuration shown in FIG. 11, the charger 160 has a function of electrostatically attracting the recording medium P to the transfer belt 24 and the transfer cylinder 28 as a main function, and the charger 180 has a function of transferring the toner image to the recording medium P as a main function, as compared with a configuration in which the voltages applied to the charger 160 and the charger 180 are the same. Thus, in the configuration shown in FIG. 11, the charger 160 and the charger 180 are functionally separated.

(Modification Relating to Chain 52)

In the exemplary embodiment, as shown in FIG. 3, the chains 52 travel between the transfer belt 24 and the transfer cylinder 28 on the downstream side in the transport direction with respect to the nip area 28A in a side view, but the present invention is not limited thereto.

Figure 12:
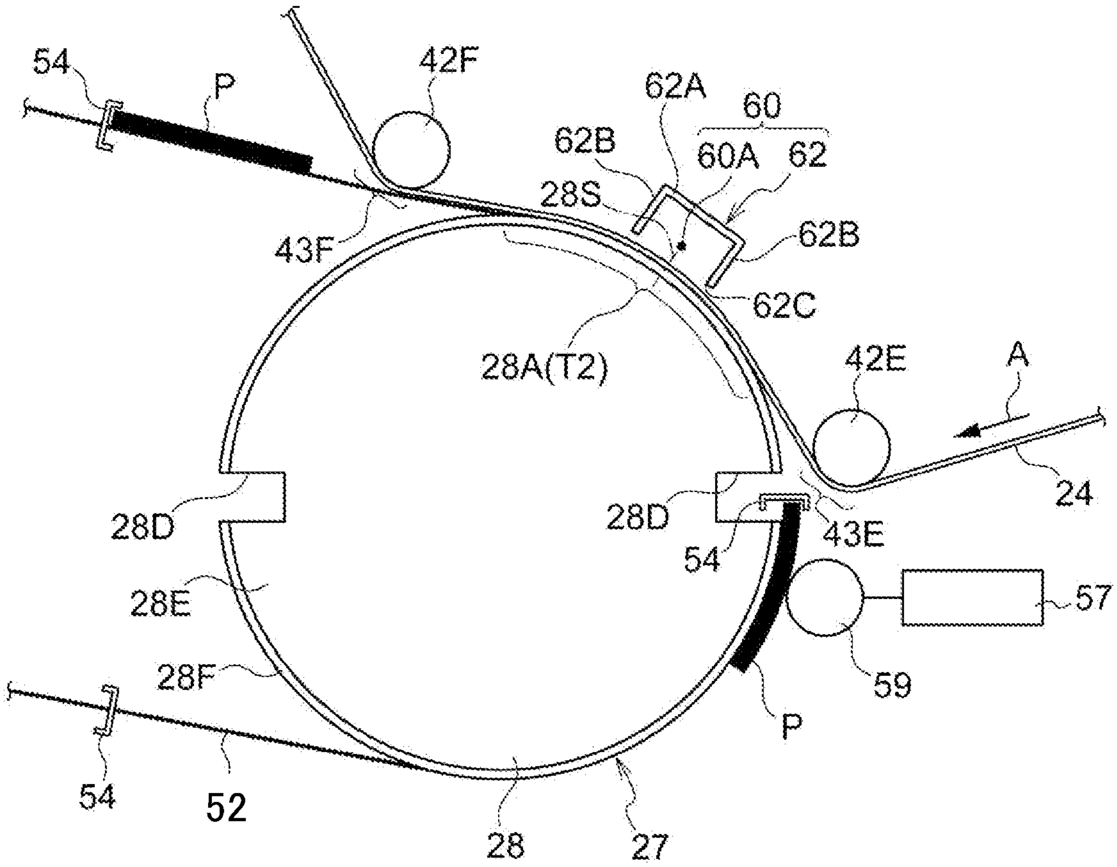
FIG. 12 is an enlarged view showing a secondary transfer portion of an image forming apparatus according to a modification.

For example, as shown in FIG. 12, the chains 52 may travel along the transfer belt 24 on the downstream side in the transport direction with respect to the nip area 28A in a side view. Specifically, the chains 52 travel along the transfer belt 24 to the winding portion 43F on the downstream side in the transport direction with respect to the nip area 28A in a side view.

Accordingly, the recording medium P transported in a state of being held by the gripper 54 moves along the transfer belt 24 to the winding portion 43F on the downstream side in the transport direction with respect to the nip area 28A, and the recording medium P is peeled off from the transfer cylinder 28 before being peeled off from the transfer belt 24.

In other words, the configuration shown in FIG. 12 is a configuration in which the recording medium P is peeled off from the transfer cylinder 28 before being peeled off from the transfer belt 24 on the downstream side in the transport direction with respect to the nip area 28A.

Figure 13:
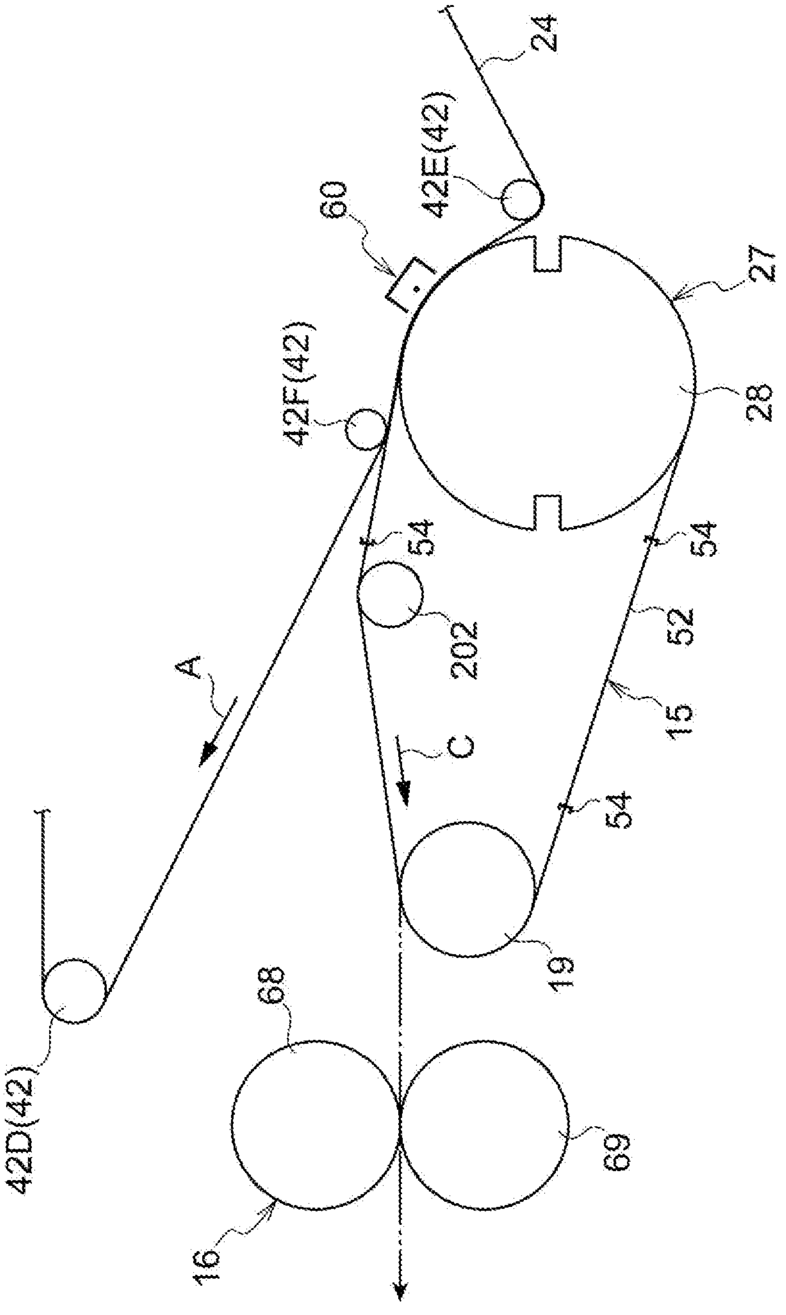
FIG. 13 is a schematic diagram showing a transport unit according to a modification.

The configuration shown in FIG. 12 is realized, for example, by supporting a portion of the chain 52 travelling from the sprockets 29 to the sprockets 19 with a sprocket 202 disposed on the inner side of the chain 52, as shown in FIG. 13.

According to the configuration shown in FIG. 12, the peeling discharge between the transfer belt 24 and the recording medium P is prevented, as compared with a configuration in which the recording medium P is peeled off from the transfer cylinder 28 after being peeled off from the transfer belt 24 on the downstream side in the transport direction with respect to the nip area 28A (hereinafter, this configuration is referred to as a configuration in which the recording medium P is peeled off from the transfer cylinder 28 after being peeled off from the transfer belt 24 on the downstream side in the transport direction with respect to the nip area 28A). As a result, the scattering of the toner of the toner image transferred to the recording medium P is prevented, as compared with the configuration in which the recording medium P is peeled off from the transfer cylinder 28 after being peeled off from the transfer belt 24 on the downstream side in the transport direction with respect to the nip area 28A.

Figure 14:
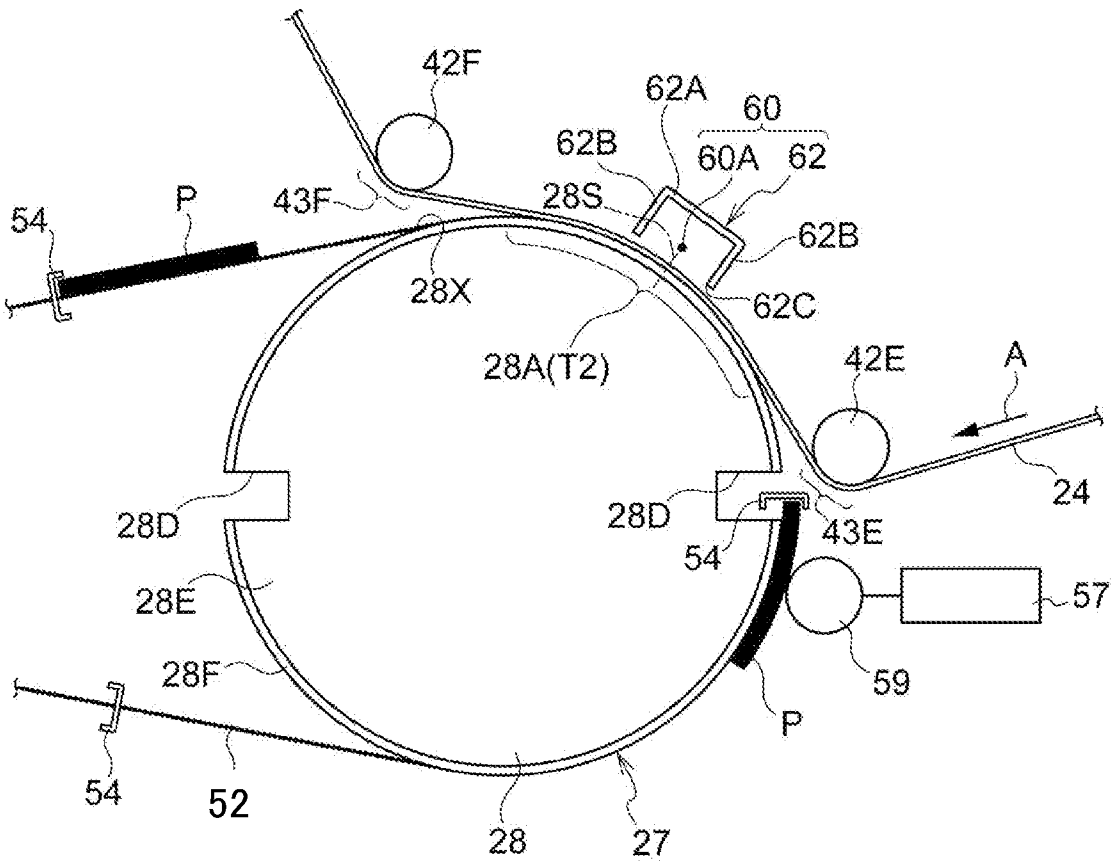
FIG. 14 is an enlarged view showing a secondary transfer portion of an image forming apparatus according to a modification.

Further, instead of the configuration shown in FIG. 3, as shown in FIG. 14, the chains 52 may travel along the transfer cylinder 28 on the downstream side in the transport direction with respect to the nip area 28A in a side view. Specifically, the chains 52 travel along the transfer cylinder 28 at least to a facing position 28X facing the winding portion 43F on the downstream side in the transport direction with respect to the nip area 28A in a side view.

Accordingly, the recording medium P transported in a state of being held by the gripper 54 moves along the transfer cylinder 28 to the winding portion 43F on the downstream side in the transport direction with respect to the nip area 28A, and the recording medium P is peeled off from the transfer cylinder 28 after being peeled off from the transfer belt 24.

In other words, the configuration shown in FIG. 14 is a configuration in which the recording medium P is peeled off from the transfer cylinder 28 after being peeled off from the transfer belt 24 on the downstream side in the transport direction with respect to the nip area 28A.

Figure 15:
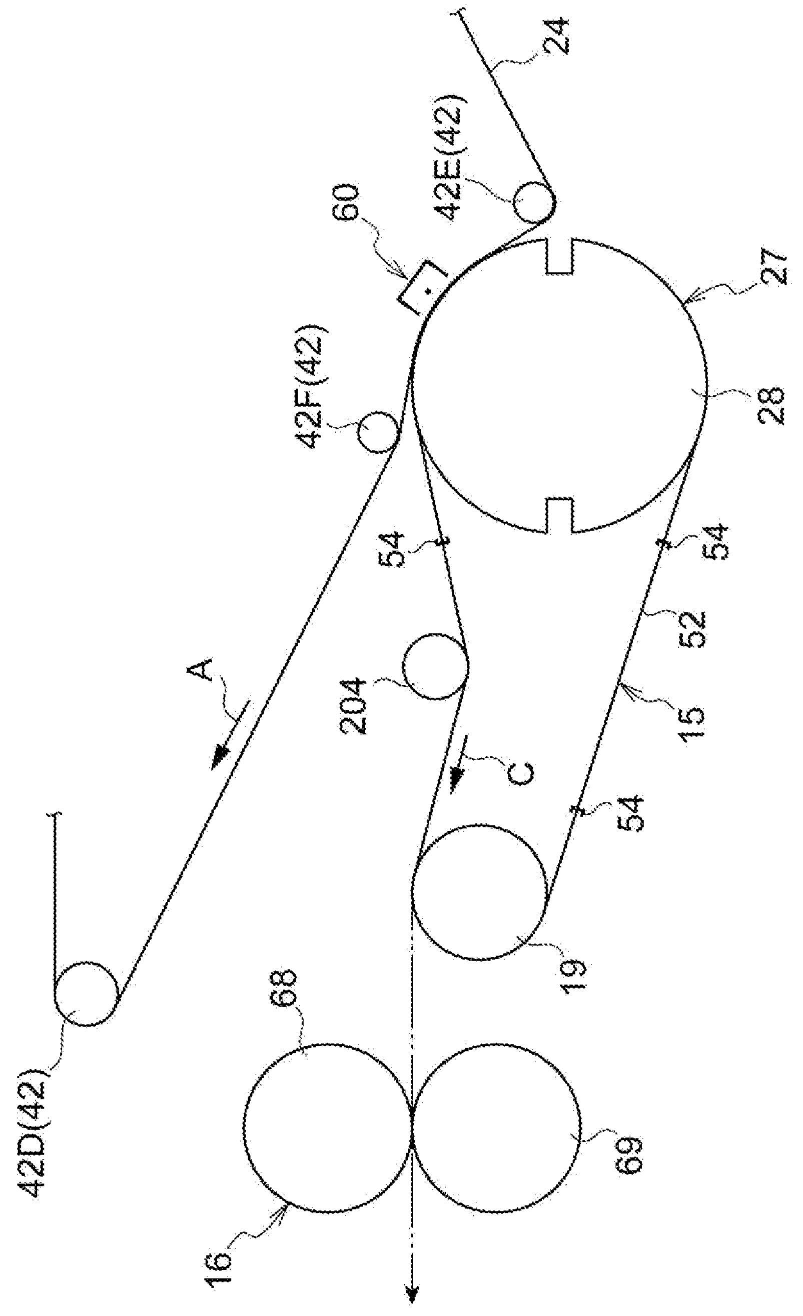
FIG. 15 is a schematic diagram showing a transport unit according to a modification.

The configuration shown in FIG. 14 is realized, for example, by supporting a portion of the chain 52 travelling from the sprockets 29 to the sprockets 19 with a sprocket 204 disposed on the outer side of the chain 52, as shown in FIG. 15.

According to the configuration shown in FIG. 14, vibration of the recording medium P is prevented, as compared with a configuration in which the recording medium P is peeled off from the transfer cylinder 28 before being peeled off from the transfer belt 24 on the downstream side in the transport direction with respect to the nip area 28A.

Figure 16:
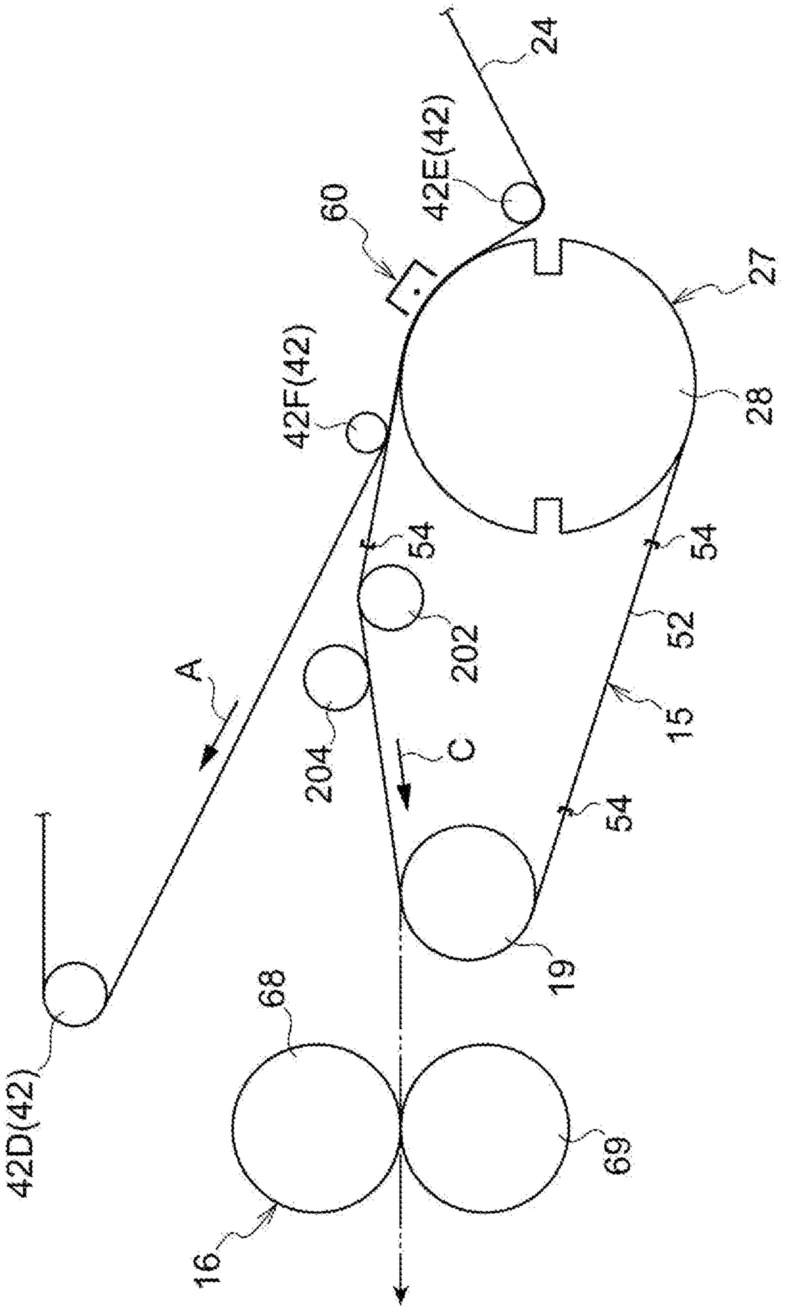
FIG. 16 is a schematic diagram showing a transport unit according to a modification.
Figure 17:
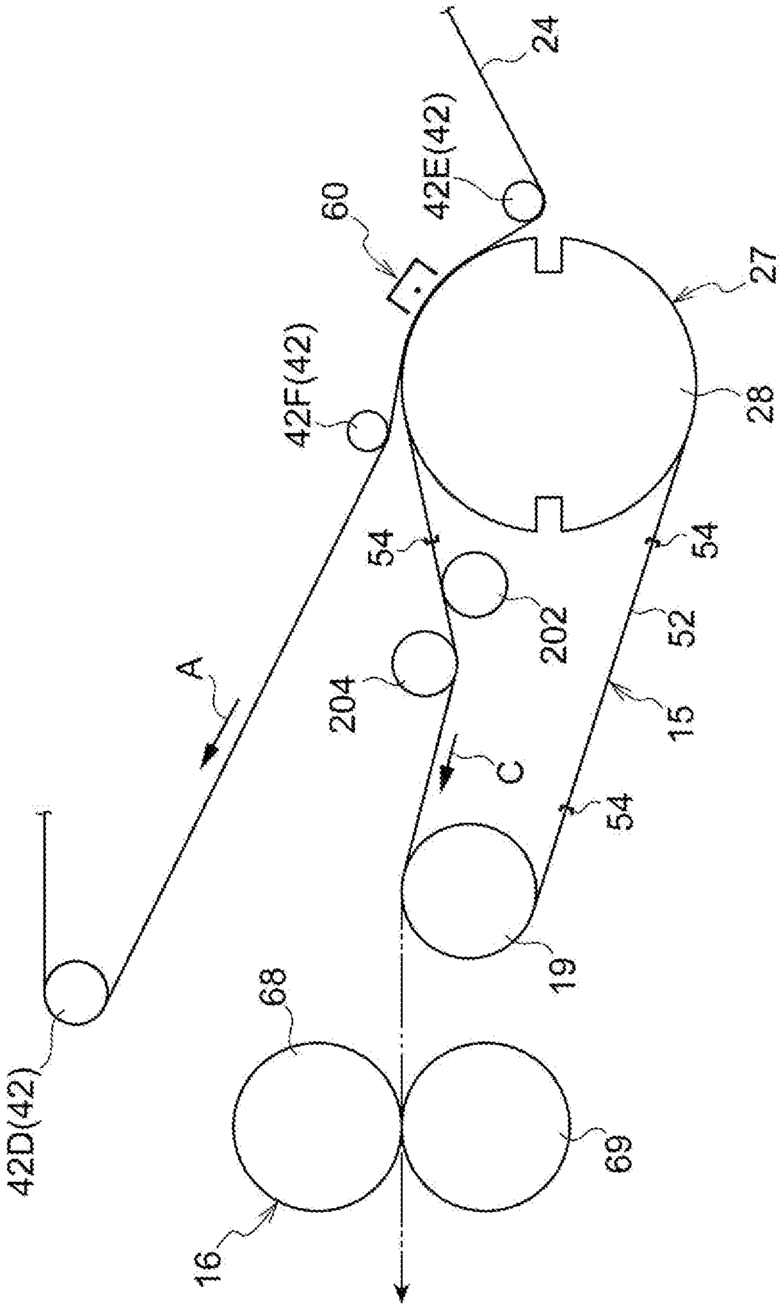
FIG. 17 is a schematic diagram showing a transport unit according to a modification.

Further, as shown in FIGS. 16 and 17, the sprocket 202 and the sprocket 204 may be provided to switch the configuration between a state (the state shown in FIG. 12) where the recording medium P is peeled off from the transfer cylinder 28 before being peeled off from the transfer belt 24 on the downstream side in the transport direction with respect to the nip area 28A and a state (the state shown in FIG. 14) where the recording medium P is peeled off from the transfer cylinder 28 after being peeled off from the transfer belt 24 on the downstream side in the transport direction with respect to the nip area 28A.

According to the configuration shown in FIGS. 16 and 17, depending on a situation in which image formation is performed, such as the type of the recording medium P, switching is made between the state shown in FIG. 12 and the state shown in FIG. 14. Specifically, for example, in the case of using a type of recording medium P (for example, thick paper) effective to prevent vibration, the configuration is switched to the state shown in FIG. 14, and in using a type of recording medium P (for example, thin paper) effective to prevent the peeling discharge with the transfer belt 24, the configuration is switched to the state shown in FIG. 12.

(Modification Relating to Fixing Device 16)

In the exemplary embodiment, as shown in FIG. 1, the fixing device 16 is provided on the downstream side of the sprocket 19 in the transport direction of the recording medium P, but the present invention is not limited thereto.

Figure 19:
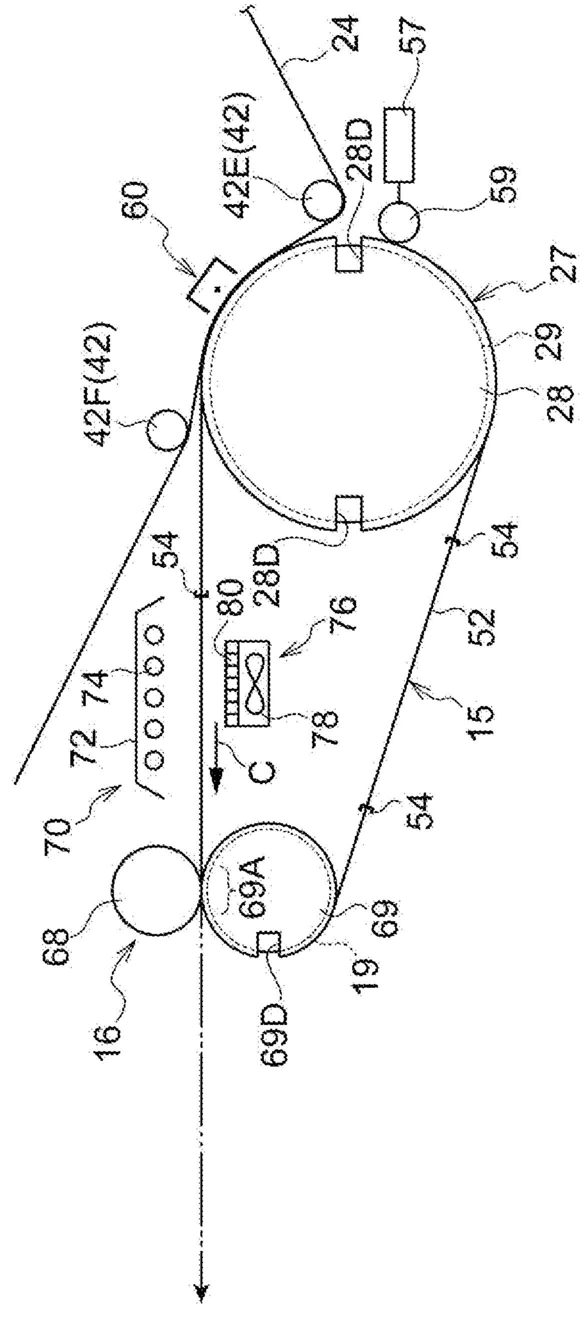
FIG. 19 is a schematic diagram showing a fixing device according to a modification.
Figure 20:
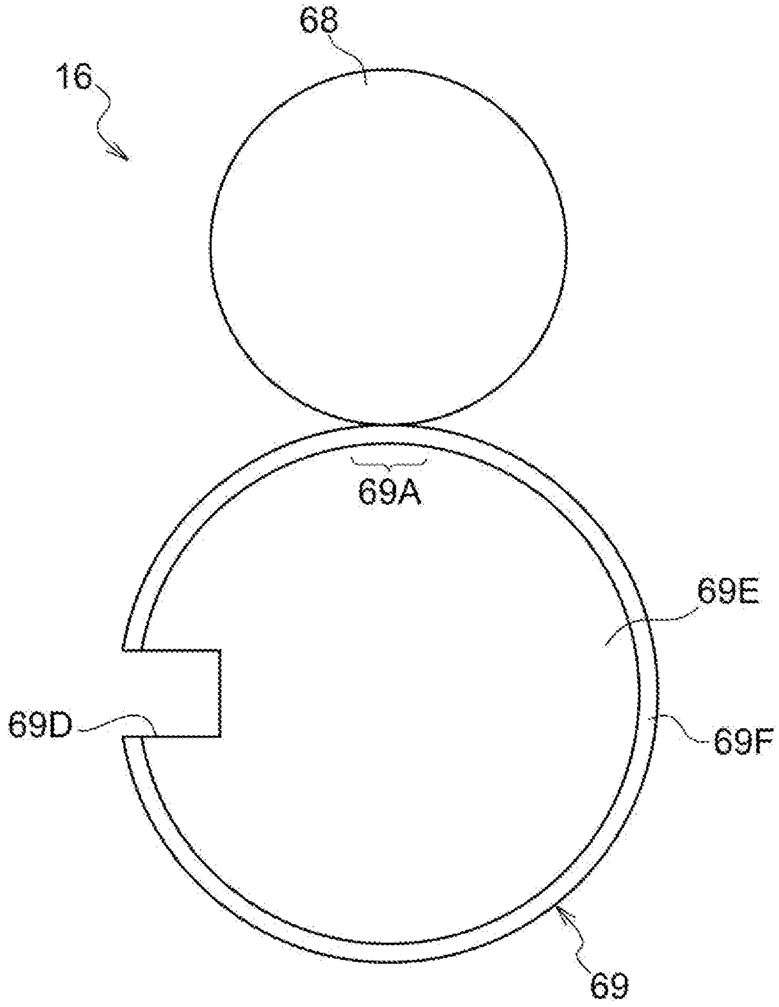
FIG. 20 is a schematic diagram showing a fixing device according to a modification.

For example, as shown in FIG. 19, the fixing device 16 may include the heating roller 68, the pressure roller 69, and the pair of sprockets 19. The fixing device 16 is an example of a fixing unit.

The pair of sprockets 19 is an example of a second rotating body. The pair of sprockets 19 is respectively disposed on both axial end sides of the pressure roller 69. In other words, the pressure roller 69 is provided between the pair of sprockets 19. Further, the pair of sprockets 19 is disposed coaxially with the pressure roller 69 and configured to rotate integrally with the pressure roller 69. The pressure roller 69 is rotationally driven by a drive unit (not shown). FIG. 19 shows, of the pair of sprockets 19, one sprocket 19 disposed on one axial end side (the back side of the sheet of FIG. 19) of the pressure roller 69.

Further, on an outer circumference of the pressure roller 69, a recessed portion 69D is formed, in which the gripper 54 and the attaching member 55 of the transport unit 15 are accommodated. A plurality of recessed portions 69D may be formed according to the disposition interval of the grippers 54 along the circulating direction C of the chain 52.

With the transport unit 15, the recording medium P passes through the nip area 28A together with the gripper 54 while being held the by the gripper 54. Further, with the transport unit 15, the recording medium P passes through the nip area 28A, and then passes through a nip area 69A (an example of a fixing area) together with the gripper 54 while being held the by the gripper 54.

According to this configuration, space is saved as compared with a configuration in which the sprocket 19 is provided as a member separate from the fixing device 16.

In addition, after the nip area 28A is passed through in the circulating direction C of the chain 52, no sprocket is provided until the recording medium P arrives at the nip area 69A.

According to this configuration, the chain 52 is wound in a straight line after the secondary transfer and before fixing, and the recording medium P on which the image is transferred is prevented from being bent and transported, as compared with a configuration in which the sprocket is provided before the recording medium P arrives at the nip area 69A after the nip area 28A is passed through in the circulating direction C of the chain 52.

The outer diameter of each of the pair of sprockets 19 is smaller than the outer diameter of the pressure roller 69. The outer diameter of the sprocket 19 is an outer diameter including the teeth (i.e., including the diameter of the tooth tip).

According to this configuration, in the nip area 69A, the recording medium P is prevented from being displaced to the downstream side in the transport direction with respect to the heating roller 68, as compared with a configuration in which the outer diameter of the sprocket 19 is equal to or larger than the outer diameter of the pressure roller 69.

The pressure roller 69 includes a base member 69E and a surface layer 69F which is wound around an outer circumference of the base member 69E and exchangeable with respect to the base member 69E. As the base member 69E, a metal material such as stainless steel is used. As the surface layer 69F, an elastic material such as silicone rubber or one obtained by sequentially laminating a release layer made of PFA on an elastic material such as silicone rubber is used. The surface layer 69F is detachably fixed to the base member 69E. Therefore, the surface layer 69F can be detached from the base member 69E, and an unused surface layer 69F can be attached thereto.

Thus, when the surface layer 69F is deteriorated, it is sufficient to replace only the surface layer 69F, and it is not necessary to replace the fixing device 16 including the pair of sprockets 19.

Further, as shown in FIG. 19, a non-contact heating unit 70 may be provided between the secondary transfer body 27 and the fixing device 16 in the transport direction of the recording medium P, which heats the recording medium P without being in contact with the recording medium P. Here, the non-contact heating unit 70 includes a reflection plate 72 and a plurality of infrared heaters 74 (hereinafter referred to as "heaters 74").

—Reflection Plate 72—

The reflection plate 72 is formed using an aluminum plate, and has a shallow bottom box shape in which the transported recording medium P side (lower side in FIG. 19) is opened. In the exemplary embodiment, as viewed from above, the reflection plate 72 is configured to cover the transported recording medium P in the depth direction (the depth direction in the sheet of FIG. 19) of the apparatus.

—Heater 74—

The heater 74 is an infrared heater whose outer shape is a cylindrical shape, and a plurality of heaters 74 are accommodated in the reflection plate 72 and disposed to extend in the depth direction of the apparatus. In the exemplary embodiment, as viewed from above, the heaters 74 are configured to cover the recording medium P to be transported in the depth direction of the apparatus. In addition, the plurality of heaters 74 are arranged in the width direction (left-right direction in FIG. 19) of the apparatus. The heater 74 is an example of a non-contact heating unit.

According to this configuration, the image can be heated without being in contact with the recording medium P, as compared with a case where no non-contact heating unit 70 is provided between the secondary transfer body 27 and the fixing device 16 in the transport direction of the recording medium P, which heats the recording medium P without being in contact with the recording medium P. Further, the recording medium P is transported while being held by the gripper 54 from the nip area 28A to the nip area 69A, so that the registration displacement of the recording medium P is prevented as compared with a case where the recording medium P is not transported while being held from the nip area 28A to the nip area 69A.

Here, in a case of performing duplex printing, an image may be already formed on a surface (hereinafter, referred to as "back surface") of the recording medium P opposite to the surface on which the image is transferred. When the recording medium P is heated in a non-contact manner, the transport unit which transports the recording medium P in contact with the back side of the recording medium P is heated by the heat received from the heater 74 and the image on the back side of the recording medium P in contact with the transport unit may be disturbed. However, in the exemplary embodiment, since the recording medium P is transported without the back surface thereof being contacted with the transport unit in the area facing the heater 74, the disruption of the image on the back surface of the recording medium P is prevented.

Further, as shown in FIG. 19, a blowing unit 76 may be provided at a position facing the heater 74 with the chain 52 (specifically, a portion on the downstream side of the sprocket 29 and on the upstream side of the sprocket 19 in the circulating direction C of the chain 52) sandwiched therebetween in a side view. The blowing unit 76 includes an air hole 80 directed to the back surface of the recording medium P and a fan 78. The blowing unit 76 is an example of a blowing unit.

In this configuration, the fan 78 blows air toward the back surface of the recording medium P, so that the posture of the recording medium P is stabilized such that the sheet surface of the recording medium P transported between the blowing unit 76 and the heater 74 is directed in an upper-lower direction. That is, when the force of the air blown out from the fan 78 is controlled, the trailing end of the transported recording medium P is prevented from moving downward with respect to the leading end of the recording medium P. The air hole 80 does not face the surface of the recording medium P to which the image is transferred. Thus, cooling of the image transferred to the recording medium P is prevented.

Other Modifications

In the exemplary embodiment, a so-called corotron is used as the charger 60, but the present invention is not limited thereto. For example, a so-called scorotron having a grid may be used as the charger 60.

Figure 18:
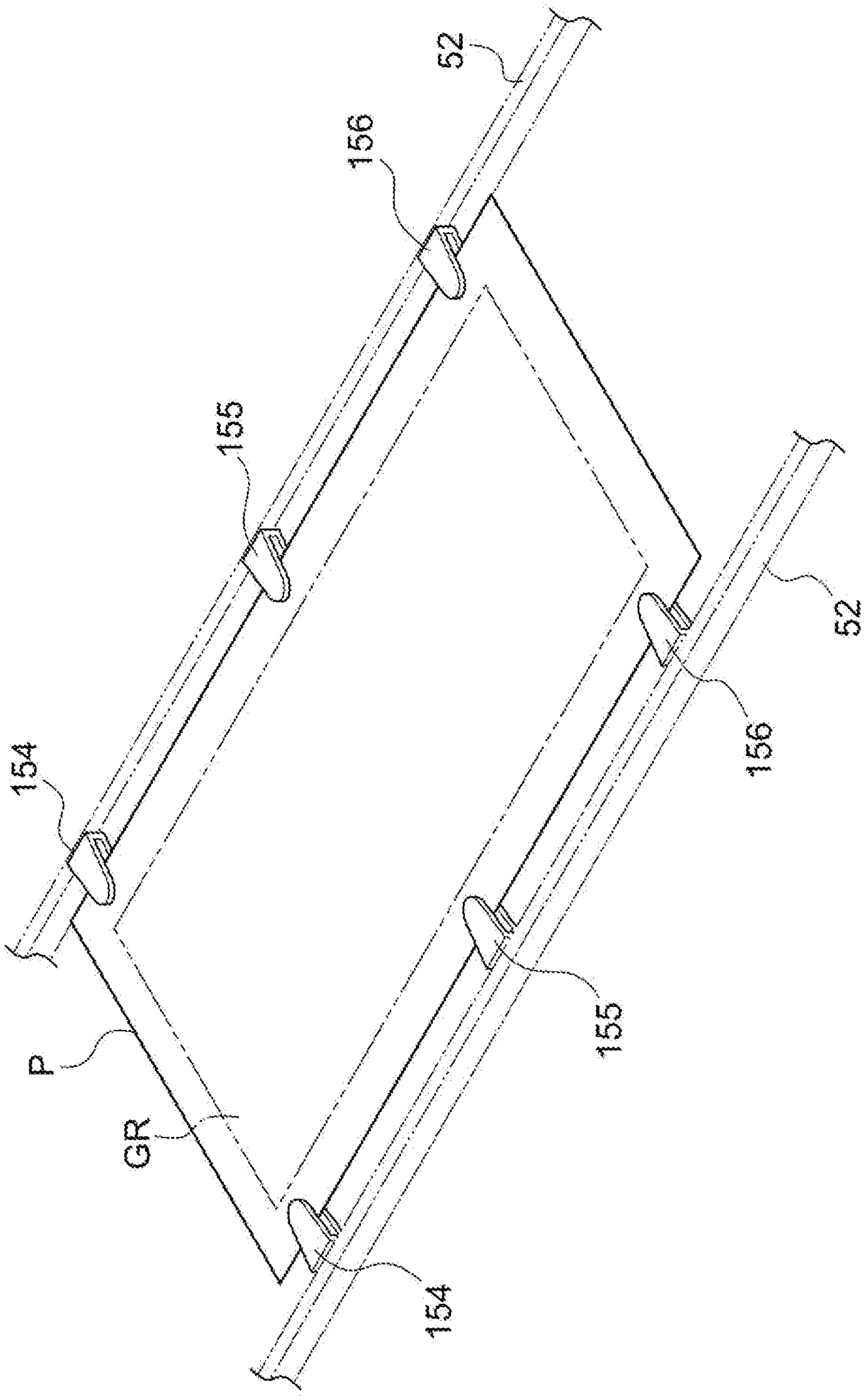
FIG. 18 is a perspective view showing a gripper according to a modification.

In addition, in the exemplary embodiment, the gripper 54 as an example of the holding unit holds the leading end portion of the recording medium P, but the present invention is not limited thereto. For example, as shown in FIG. 18, grippers 154, 155 and 156 which hold the side end portion of the recording medium P may be used as examples of the holding unit. In this configuration, the grippers 154, 155 and 156 hold the recording medium P in an area outside an area GR to which the toner image of the recording medium P is transferred. Also in this configuration, when transporting the recording medium P, the grippers 154, 155 and 156 pass through the nip area 28A in a side view. In FIG. 18, the chains 52 are shown in a simplified manner. In addition, FIG. 18 shows a state where the recording medium P is transported between the sprocket 29 and the sprocket 19.

Further, the holding unit may be configured only by the gripper 154 which holds the leading end side of the recording medium P. The leading end side of the recording medium is a portion on the downstream side (front side) of the center of the recording medium in the transport direction.

Further, in the exemplary embodiment, the chain 52 is used as an example of the circulating member, but the present invention is not limited thereto. For example, a timing belt may be used as an example of the circulating member. In addition, in the exemplary embodiment, the sprocket 29 was used as an example of the rotating body, but the present invention is not limited thereto. For example, a timing pulley around which a timing belt is wound may be used as an example of the rotating body. When a timing pulley is used as an example of the rotating body, a timing pulley is also used instead of the sprocket 19. In the configurations shown in FIG. 12 to FIG. 17, when a timing pulley is used as an example of the rotating body, a timing pulley is used instead of the sprockets 202 and 204.

In addition, in the exemplary embodiment, the charger 60 is used as an example of the facing portion, but the present invention is not limited thereto. For example, a facing roller in contact with the transfer belt 24 may be used as an example of the facing portion.

In addition, in the exemplary embodiment, the heating roller 68 is used as an example of the heating unit, but the present invention is not limited thereto. For example, a heating belt in contact with the pressure roller 69 may be used as an example of the heating unit.

In addition, in the exemplary embodiment, the heater 74 is used as an example of the non-contact heating unit, but the present invention is not limited thereto. For example, a halogen lamp may be used as an example of the non-contact heating unit.

The present invention is not limited to the above embodiment, and various modifications, changes, and improvements can be made without departing from the scope of the invention. For example, the modifications shown above may be combined with each other as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an annular transfer belt having an outer surface on which an image is transferred;

a transferring unit including a transfer cylinder having a transfer area that sandwiches a recording medium with the outer surface of the transfer belt to transfer the image from the outer surface of the transfer belt to the recording medium;

a fixing unit including a heating unit; and a pressure roller having a fixing area configured to sandwich the recording medium with an outer surface of the heating unit to fix the image on the recording medium;

a pair of chains or a pair of timing belts, each configured to hold the recording medium, and transport the recording medium from the transferring unit to the fixing unit; and a gripper attached to the pair of chains or the pair of timing belts, the gripper being configured to hold the recording medium, transport the recording medium by the pair of chains or the pair of timing belts, and pass the recording medium through the transfer area and the fixing area.

2. An image forming apparatus according to claim 1, further comprising a pair of first rotating bodies disposed on both axial end sides of the transfer cylinder, wherein outer diameters of the first rotating bodies are smaller than an outer diameter of the transfer cylinder.

3. An image forming apparatus according to claim 1, further comprising a pair of first rotating bodies disposed on both axial end sides of the transfer cylinder, wherein the transfer cylinder comprises:

a base member; and a surface layer wound around an outer circumference of the base member to be replaceable with respect to the base member.

4. An image forming apparatus according to claim 1, further comprising a pair of first rotating bodies disposed on both axial end sides of the transfer cylinder; and a pair of second rotating bodies disposed on both axial end sides of the pressure roller, wherein the pair of chains or the pair of timing belts are further wound around the second rotating bodies and are configured to circulate by rotation of the second rotating bodies.

5. An image forming apparatus according to claim 4, wherein outer diameters of the second rotating bodies are smaller than an outer diameter of the pressure roller.

6. An image forming apparatus according to claim 4, wherein the pressure roller comprises:

a base member; and a surface layer wound around the outer circumference of the base member to be replaceable with respect to the base member.

7. An image forming apparatus according to claim 4, further comprising a non-contact heating unit provided between the transfer unit and the fixing unit in a transport direction of the recording medium, the non-contact heating unit being configured to heat the image transferred to the recording medium in a non-contact manner.

8. An image forming apparatus according to claim 7, further comprising:

a blowing unit that blows air to a back surface of the recording medium transported by the gripper.

9. An image forming apparatus according to claim 2, wherein the transfer cylinder comprises:

a base member; and a surface layer wound around an outer circumference of the base member to be replaceable with respect to the base member.

10. An image forming apparatus according to claim 2, further comprising a pair of second rotating bodies disposed on both axial end sides of the pressure roller, wherein the pair of chains or the pair of timing belts are further wound around the second rotating bodies and are configured to circulate by rotation of the second rotating bodies.

11. An image forming apparatus according to claim 3, further comprising a pair of second rotating bodies disposed on both axial end sides of the pressure roller, wherein the pair of chains or the pair of timing belts are further wound around the second rotating bodies and are configured to circulate by rotation of the second rotating bodies.

12. An image forming apparatus according to claim 9, further comprising a pair of second rotating bodies disposed on both axial end sides of the pressure roller, wherein the pair of chains or the pair of timing belts are further wound around the second rotating bodies and are configured to circulate by rotation of the second rotating bodies.

13. An image forming apparatus according to claim 10, wherein outer diameters of the second rotating bodies are smaller than an outer diameter of the pressure roller.

14. An image forming apparatus according to claim 11, wherein outer diameters of the second rotating bodies are smaller than an outer diameter of the pressure roller.

15. An image forming apparatus according to claim 12, wherein outer diameters of the second rotating bodies are smaller than an outer diameter of the pressure roller.

16. An image forming apparatus according to claim 5, wherein the pressure roller comprises:

a base member; and a surface layer wound around the outer circumference of the base member to be replaceable with respect to the base member.

17. An image forming apparatus according to claim 10, wherein the pressure roller comprises:

a base member; and a surface layer wound around the outer circumference of the base member to be replaceable with respect to the base member.

18. An image forming apparatus according to claim 11, wherein the pressure roller comprises:

a base member; and a surface layer wound around the outer circumference of the base member to be replaceable with respect to the base member.

19. An image forming apparatus according to claim 12, wherein the pressure roller comprises:

a base member; and a surface layer wound around the outer circumference of the base member to be replaceable with respect to the base member.

20. An image forming apparatus according to claim 13, wherein the pressure roller comprises:

a base member; and a surface layer wound around the outer circumference of the base member to be replaceable with respect to the base member.

* * * * *